United States Patent
Quinlan et al.

(10) Patent No.: US 10,931,077 B2
(45) Date of Patent: Feb. 23, 2021

(54) OPTICAL REFERENCE CAVITY

(71) Applicant: Government of the United States of America, as represented by the Secretary of Commerce, Gaithersburg, MD (US)

(72) Inventors: Franklyn Quinlan, Longmont, CO (US); Scott Diddams, Louisville, CO (US); Andrew Ludlow, Longmont, CO (US); Frederick Baynes, Kensington (AU); Josue Davila-Rodriguez, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 84 days.

(21) Appl. No.: 16/275,035

(22) Filed: Feb. 13, 2019

(65) Prior Publication Data
US 2019/0252848 A1   Aug. 15, 2019

Related U.S. Application Data

(60) Provisional application No. 62/629,793, filed on Feb. 13, 2018.

(51) Int. Cl.
*H01S 3/13* (2006.01)
*H01S 3/00* (2006.01)
*G02F 1/00* (2006.01)

(52) U.S. Cl.
CPC .............. *H01S 3/1303* (2013.01); *G02F 1/00* (2013.01); *H01S 3/005* (2013.01); *H01S 3/1305* (2013.01); *H01S 2301/02* (2013.01)

(58) Field of Classification Search
CPC ...... H01S 3/1303; H01S 3/1305; H01S 3/005; H01S 2301/02; G02F 1/00
See application file for complete search history.

(56) References Cited

PUBLICATIONS

J. Davila-Rodriguez, F. N. Baynes, A. D. Ludlow, T. M. Fortier, H. Leopardi, S. A. Diddams, and F. Quinlan, "Compact, thermal-noise-limited reference cavity for ultra-low-noise microwave generation," Opt. Lett. 42, 1277-1280 (2017) (Year: 2017).*

(Continued)

*Primary Examiner* — Xinning(Tom) Niu
(74) *Attorney, Agent, or Firm* — Office of Chief Counsel for National Institute of Standards and Technology

(57) ABSTRACT

An optical reference cavity includes: a cell that includes: a cylindrical body; end faces; an optical canal having an interior cylindrical geometry; and an exterior surface having an exterior cylindrical geometry; mirrors disposed on the end faces; an aspect ratio that is less than 1; a compression clamp that holds the cell through compression and includes compression platens disposed on the end faces so that the compression platens exert a compressive force to the end faces at a radius from a central axis of the cell so that the cell is compressed by the compression clamp, and a length of the optical canal is unperturbed to first order with a magnitude of the compressive force; and a compression intermediary interposed between the compression platens and end faces, wherein the length of the optical canal is insensitive to vibration coupled to the cell by the compression clamp and compression intermediaries.

20 Claims, 37 Drawing Sheets

(56) References Cited

PUBLICATIONS

S. Webster & P. Gill, "Force insensitive optical cavity", Optic Letters, 2011, p. 3572, vol. 36 No. 18.
D. R. Leibrandt, et al., "Spherical reference cavities for frequency stabilization of lasers in non-laboratory environments," Optics Express, 2011, p. 3471-3482, vol. 19 No. 4.
A. Didier, et al., "Design of an ultra-compact reference ULE cavity," Journal of Physics: Conference Series, 2016, p. 012029, vol. 723.
B. Argence, et al., "Prototype of an ultra-stable optical cavity for space applications," Optic Express, 2012, p. 25409-25420, vol. 20 No. 23.

\* cited by examiner (A)

(B)

(C)

OPTICAL REFERENCE CAVITY

CROSS REFERENCE TO RELATED APPLICATIONS

The application claims priority to U.S. Provisional Patent Application Ser. No. 62/629,793 filed Feb. 13, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement No. IAA #1602-688-11DAR awarded by the Defense Advanced Research Projects Agency (DARPA). The Government has certain rights in the invention. Licensing inquiries may be directed to the Technology Partnerships Office, NIST, Gaithersburg, Md., 20899; voice (301) 301-975-2573; email tpo@nist.gov; reference.

BRIEF DESCRIPTION

Disclosed is an optical reference cavity for producing thermal-noise-limited optical radiation, the optical reference cavity comprising: a cell comprising: a cylindrical body; a first end face disposed at a first end of the cylindrical body; a second end face disposed at a second end of the cylindrical body and opposing the first end face; an optical canal extending through the cell from the first end face to the second end bounded by an optical cavity wall that comprises an interior cylindrical geometry; and an exterior surface extending the from the first end face to the second end and comprising an exterior cylindrical geometry that circumscribes and is coaxial with the interior cylindrical geometry of the optical cavity wall; a first mirror disposed on the first end face; a second mirror disposed on the second end face, and the first mirror and the second mirror bound the optical canal; an aspect ratio given by a length of the optical canal to a diameter of the cylindrical body at the exterior surface that less than 1 and greater than 0.1; a compression clamp for receiving and rigidly holding the cell through compression, the compression clamp comprising: a first compression platen disposed on the first end face; a second compression platen disposed on the second end face; and a compression fastener that engages the first compression platen and the second compression platen so that: the first compression platen and the second compression platen compress the cell by exerting a compressive force to the first end face and the second end face, wherein the compressive force is exerted at a radius from a central axis of the cell so that the cell is compressed by the compression clamp, and a length of the optical canal is unperturbed to first order with a magnitude of the compressive force; a first compression intermediary interposed between the first compression platen and the first end face; and a second compression intermediary interposed between the second compression platen and the second end face, and the length of the optical canal is insensitive to vibration coupled to the cell by the compression clamp, the first compression intermediary, and the second compression intermediary.

Also disclosed is a stabilized laser system for producing ultra-low-noise optical radiation, the stabilized laser system comprising: a laser that: produces laser light; receives stabilization light; and locks to stabilization light so that the laser light is ultra-low-noise optical radiation; the optical reference cavity of claim 1 in optical communication with laser and that: receives laser light from the laser; and produces the stabilization light; communicates the stabilization light to the laser.

BRIEF DESCRIPTION OF THE DRAWINGS

The following description should not be considered limiting in any way. With reference to the accompanying drawings, like elements are numbered alike.

DETAILED DESCRIPTION

Figure 1:
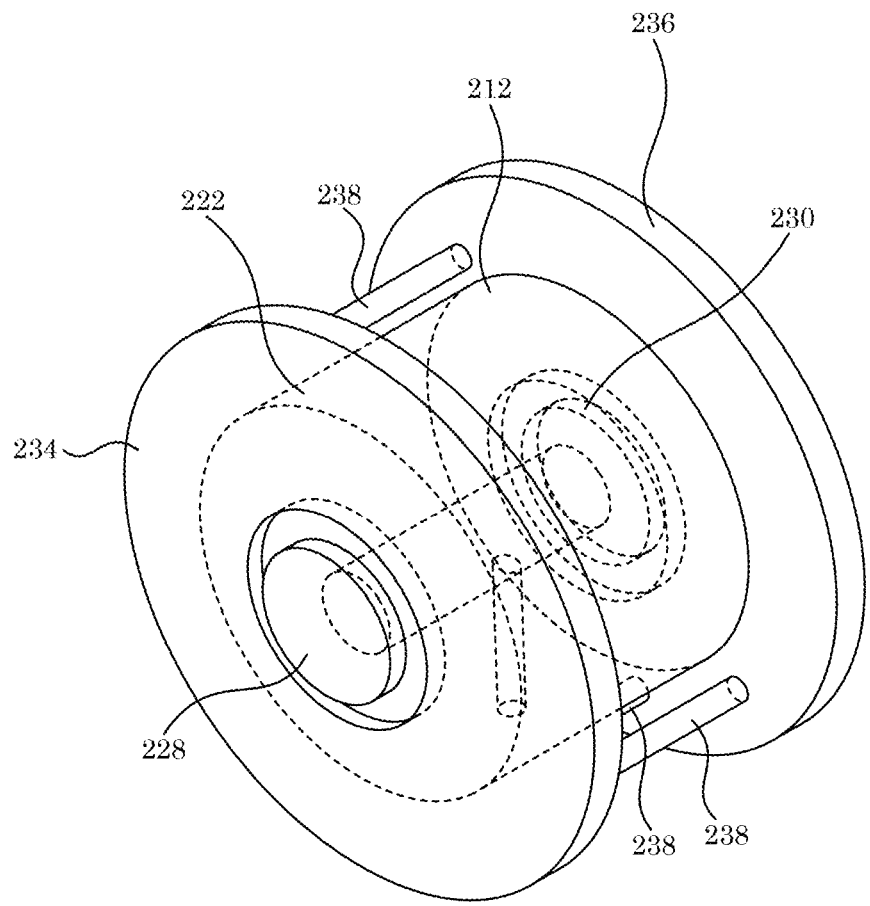
FIG. 1 shows a perspective view of an optical reference cavity 200.
Figure 2:
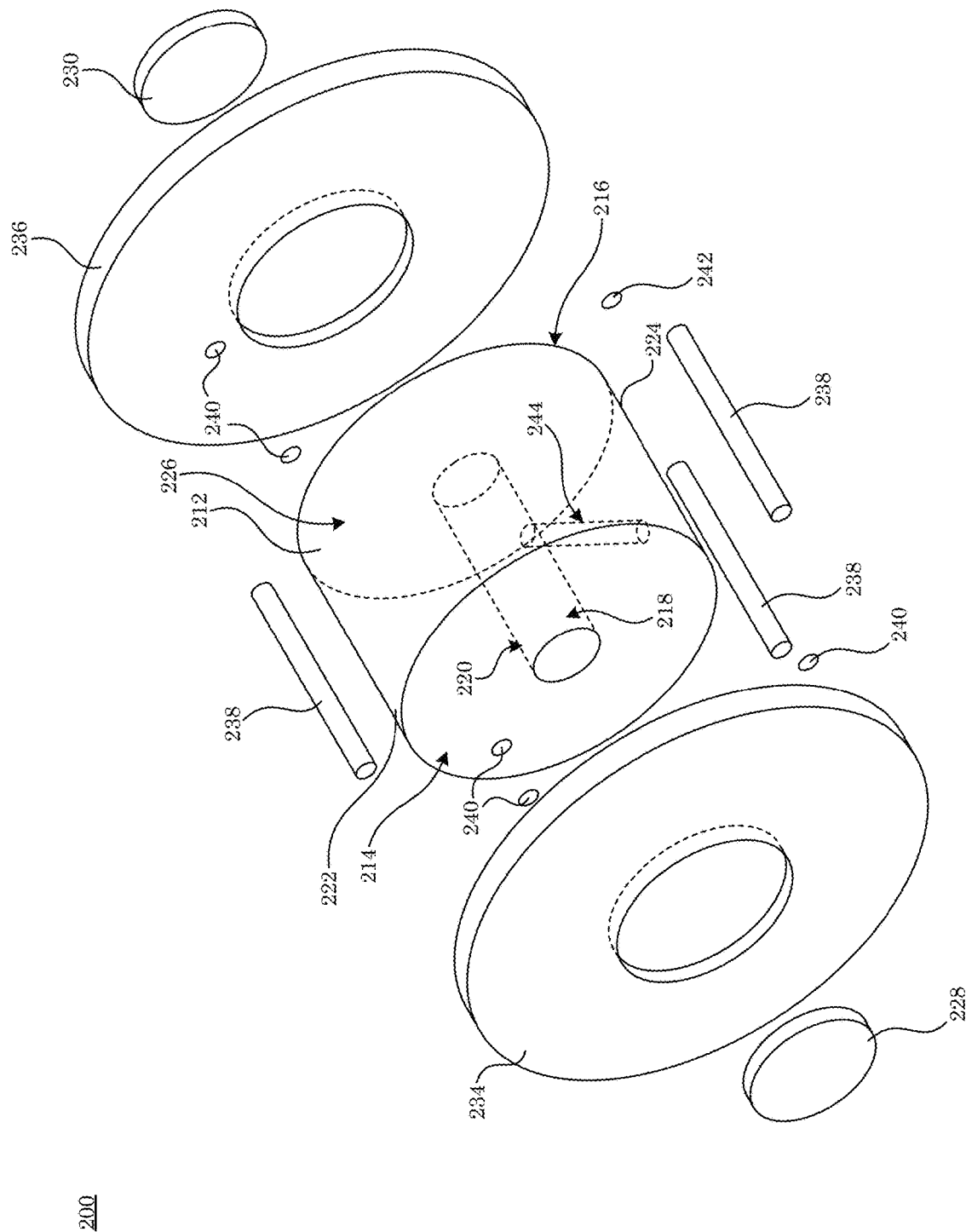
FIG. 2 shows an exploded view of the optical reference cavity 200 shown in FIG. 1.
Figure 3:
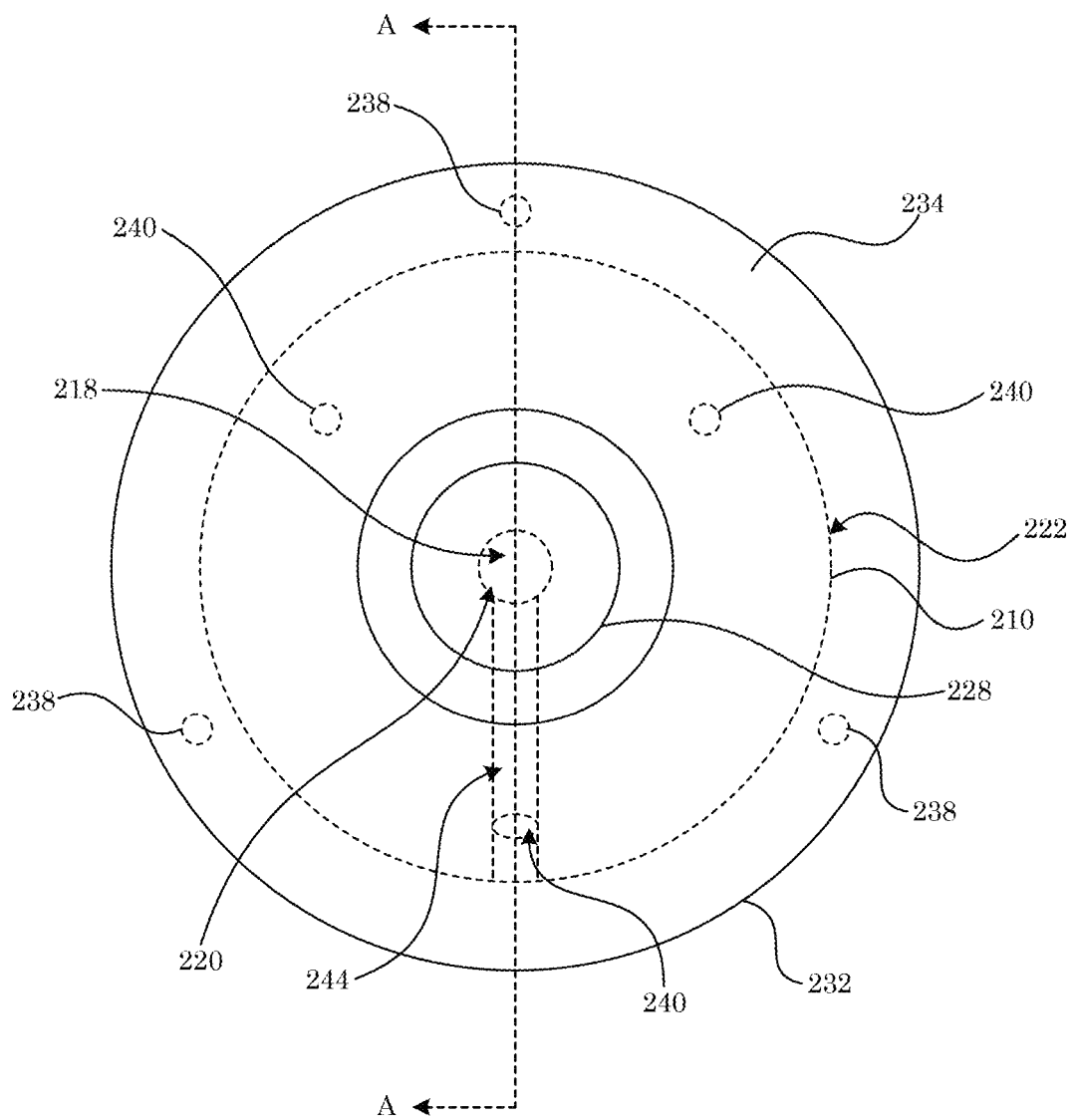
FIG. 3 shows an end view of the optical reference cavity 200 shown in FIG. 1.
Figure 4:
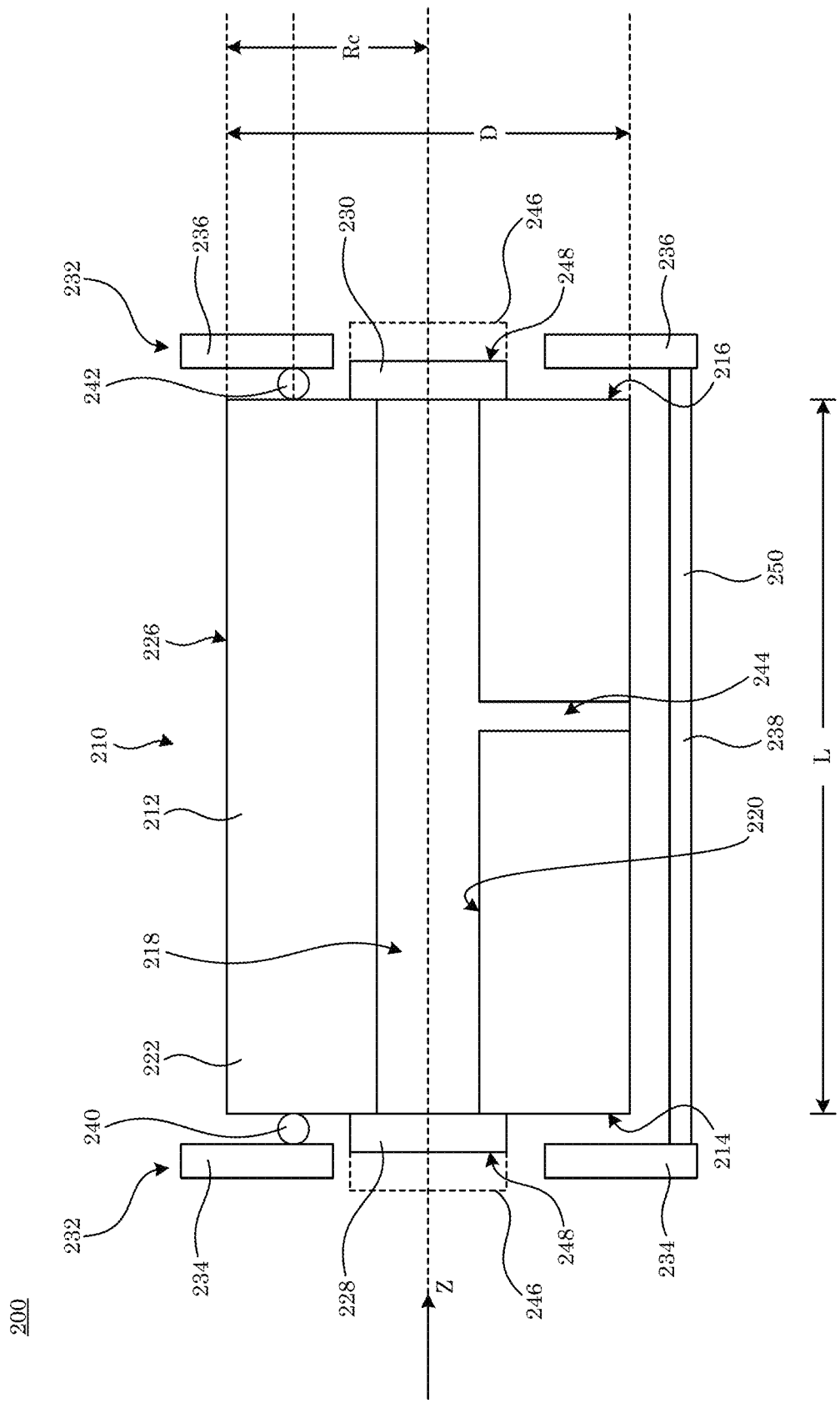
FIG. 4 shows a cross-section along line A-A of the optical reference cavity 200 shown in FIG. 3.

A detailed description of one or more embodiments is presented herein by way of exemplification and not limitation.

It has been discovered that an optical reference cavity with cylindrical symmetry is passive, compact, and rigidly held stabilizes a frequency of a laser at a sub-1 Hz level. The optical reference cavity is operable at cryogenic temperatures and vibrationally-insensitive and also is operable at room temperature outside a staid laboratory environment. A stabilized laser system that includes the optical reference cavity can be used in spectroscopy, an optical atomic clock, or production of an ultra-stable RF, microwave, or mm-wave signal in combination with an optical frequency comb.

The optical reference cavity overcomes technical limitation of conventional cavities that have a design asymmetry and does not degrade acceleration or holding force sensitivity.

Optical reference cavity 200 produces thermal-noise-limited optical radiation. In an embodiment, with reference to FIG. 1, FIG. 2, FIG. 3, and FIG. 4, optical reference cavity 200 includes cell 210. Cell 210 includes cylindrical body 212, first end face 214 disposed at first end 222 of cylindrical body 212; second end face 216 disposed at second end 224 of cylindrical body 212 and opposing first end face 214; optical canal 218 extending through cell 210 from first end face 214 to second end 216 bounded by optical cavity wall 220. Optical cavity wall 220 has an interior cylindrical geometry, and exterior surface 226 extends from first end face 214 to second end 216. Exterior surface 226 has an exterior cylindrical geometry that circumscribes and is coaxial with the interior cylindrical geometry of optical cavity wall 220. First mirror 228 is disposed on first end face 214, and second mirror 230 is disposed on second end face 216. First mirror 228 and second mirror 230 bound optical canal 218 such that an aspect ratio, given by a length of optical canal 218 to a diameter of cylindrical body 212 at exterior surface 226, is less than 1 and greater than 0.1. Optical reference cavity 200 also includes compression clamp 232 for receiving and rigidly holding cell 210 through compression. Compression clamp 232 includes first compression platen 234 disposed on first end face 214, second compression platen 236 disposed on second end face 216, and compression fastener 238 that engages first compression platen 234 and second compression platen 236. In this manner, first compression platen 234 and second compression platen 236 compress cell 210 by exerting a compressive force to first end face 214 and second end face 216. The compressive force is exerted at a radius from a central axis of cell 210 so that cell 210 is compressed by compression clamp 232. Moreover, due to compression at this radius, a length of optical canal 218 is unperturbed to first order with a magnitude of the compressive force. Optical reference cavity 200 further includes first compression intermediary 240 interposed between first compression platen 234 and first end face 214, and second compression intermediary 242 interposed between second compression platen 236 and second end face 216. As a result, the length of optical canal 218 is insensitive to vibration coupled to cell 210 by compression clamp 232, first compression intermediary 240, and second compression intermediary 242.

In an embodiment, optical reference cavity 200 includes radial bore 244 disposed in cylindrical body 212 of cell 210 for venting optical canal 218. Radial bore 244 is in fluid communication with optical canal 218 and exterior surface 226 of cell 210 and extends from optical canal 218 to exterior surface 226.

In an embodiment, optical reference cavity 200 includes thermal expansion control ring 246 disposed on outer surface 248 of first mirror 228 or second mirror 230. Thermal expansion control ring 246 controls a thermal expansion of cell 210 through straining the mirror upon which thermal expansion control ring 246 is disposed.

Figure 15:
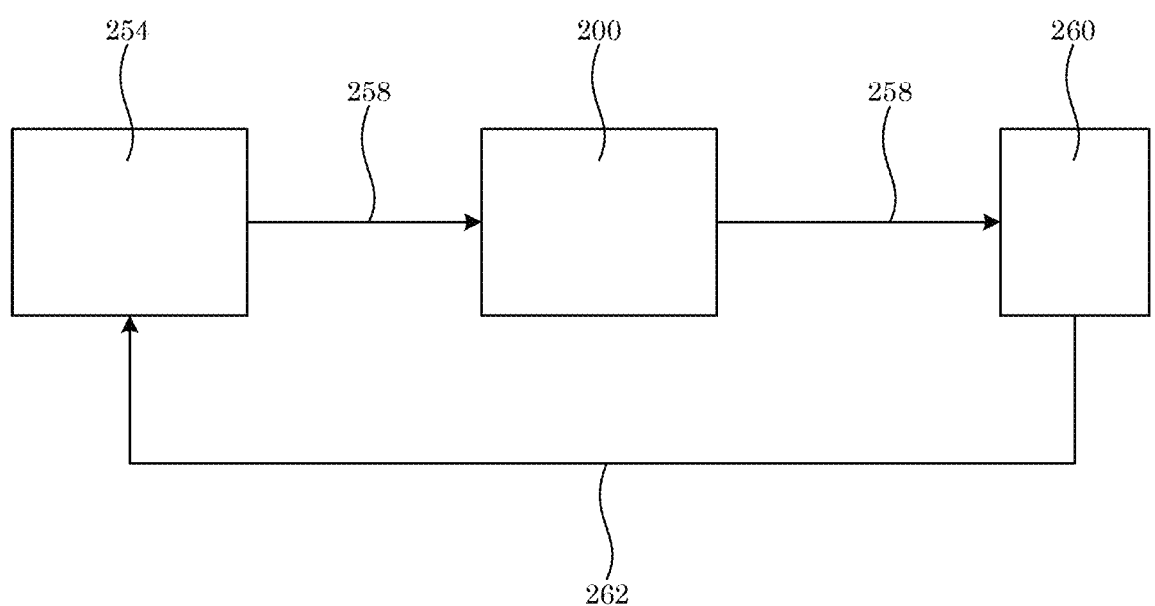
FIG. 15 shows a stabilized laser system 252.

Optical reference cavity 200 produces stabilization light 258 in response to receiving laser light 256 as shown in FIG. 15. Optical reference cavity 200 includes cell 210 that can include a spacer with a center canal and bore hole and two end mirrors to form an optical resonator. Moreover, cell 210 is interposed between two compression platens for rigid holding of the optical resonator. In an embodiment, cell 210 includes a spacer made of ultralow expansion glass containing a center canal and bore hole; fused silica mirrors coated with high reflectivity, low loss dielectric materials; and ultralow expansion glass thermal control rings. Cell 210 can include a low thermal expansion material suited for optically stable metrology systems such as ultra-low expansion (ULE) glass and Zerodur, or a crystalline material such as silicon, sapphire, and the like. A coefficient of thermal expansion of cell 210 can be from 50 ppb/C to −50 ppb/C, specifically from 10 ppb/C to −10 ppb/C. Diameter D of cylindrical body 212 can be from 100 mm to 5 mm, specifically from 50 mm to 10 mm, and more specifically from 50 mm to 25 mm. Length L of cylindrical body 212 can be from 50 mm to 5 mm, specifically from 25 mm to 6.25 mm. An aspect ratio of cell 210, given by a length of the optical canal 218 to a diameter of the cylindrical body 212 at the exterior surface 226, can be from 1:1 to 1:10, specifically from 1:1 to 1:4. In an embodiment, the aspect ratio is 1:2.

First end face 214 and second in the face 216 respectively receive first mirror 228 and second mirror 230. First end face 214 and second end face 216 independently can be planar in an area that receives mirrors (228, 230). Optical canal 218 is disposed in cylindrical body 212 of cell 210 and bounded by optical cavity wall 220 and mirrors (228, 230). In this configuration, optical canal 218 as a cylindrical geometry that in combination with the cylindrical geometry of exterior surface 226 of cell 210 provide a cylindrical optical cavity for optical reference cavity 200. A volume of optical canal 218 can be from 4 cm³ to 0.01 cm³, specifically from 4 cm³ to 0.1 cm³, and more specifically from 4 cm³ to 1 cm³. A diameter of optical canal 218 can be from 20 mm to 1 mm, specifically from 10 mm to 2 mm, and more specifically from 7 mm to 3 mm. Optical canal 218 is in fluid communication with radial bore 244. Radial bore 244 can have a diameter from 20 mm to 0.5 mm, specifically from 15 mm to 1 mm, and more specifically from 10 mm to 5 mm. A length of radial bore 244 can be from 50 mm to 2.5 mm, specifically from 25 mm to 5 mm, and more specifically from 25 mm to 12.5 mm. In an embodiment, the radial bore extends from the exterior surface to the optical canal. Evacuation of a fluid from optical canal 218 occurs via radial bore 244. Similarly, introduction of a fluid into optical canal 218 occurs via radial bore 244. It is contemplated that real bore 244 can be absent in some embodiments so that optical canal 218 can be evacuated filled with the fluid to a selected pressure and sealed to prevent leakage of fluid into or out of optical canal 218 with an exterior of cell 210. A pressure in optical canal 212 can be from $1\times10^{-5}$ torr to $1\times10^{-11}$ torr, specifically from $1\times10^{-6}$ torr to $1\times10^{-9}$ torr, and more specifically from $5\times10^{-7}$ torr to $5\times10^{-9}$ torr.

First end mirror 228 and second end mirror 230 can include high reflective coatings of amorphous dielectric material, crystalline materials or metals. Moreover, the end mirrors can have a wedge angle between front and back sides, and the backside of the mirrors can be coated with an anti-reflection coating. In an embodiment, mirrors (228, 230) include fused silica substrates with high reflection dielectric coatings of $SiO_2/Ta_2O_5$. First in mirror 228 and second end mirror 230 independently can have a radius of curvature that can be from 5 mm to flat. In an embodiment, first end mirror 228 has a radius of curvature that is 10.2 meters, and second end mirror 230 has an infinite radius of curvature (flat). In some embodiments, first end mirror 228 and second end mirror 230 are identical. In some embodiments, the first end mirror 228 and second end mirror 230 are different in that the radii of curvature are different, or they are manufactured from different materials, or both.

Figure 8:
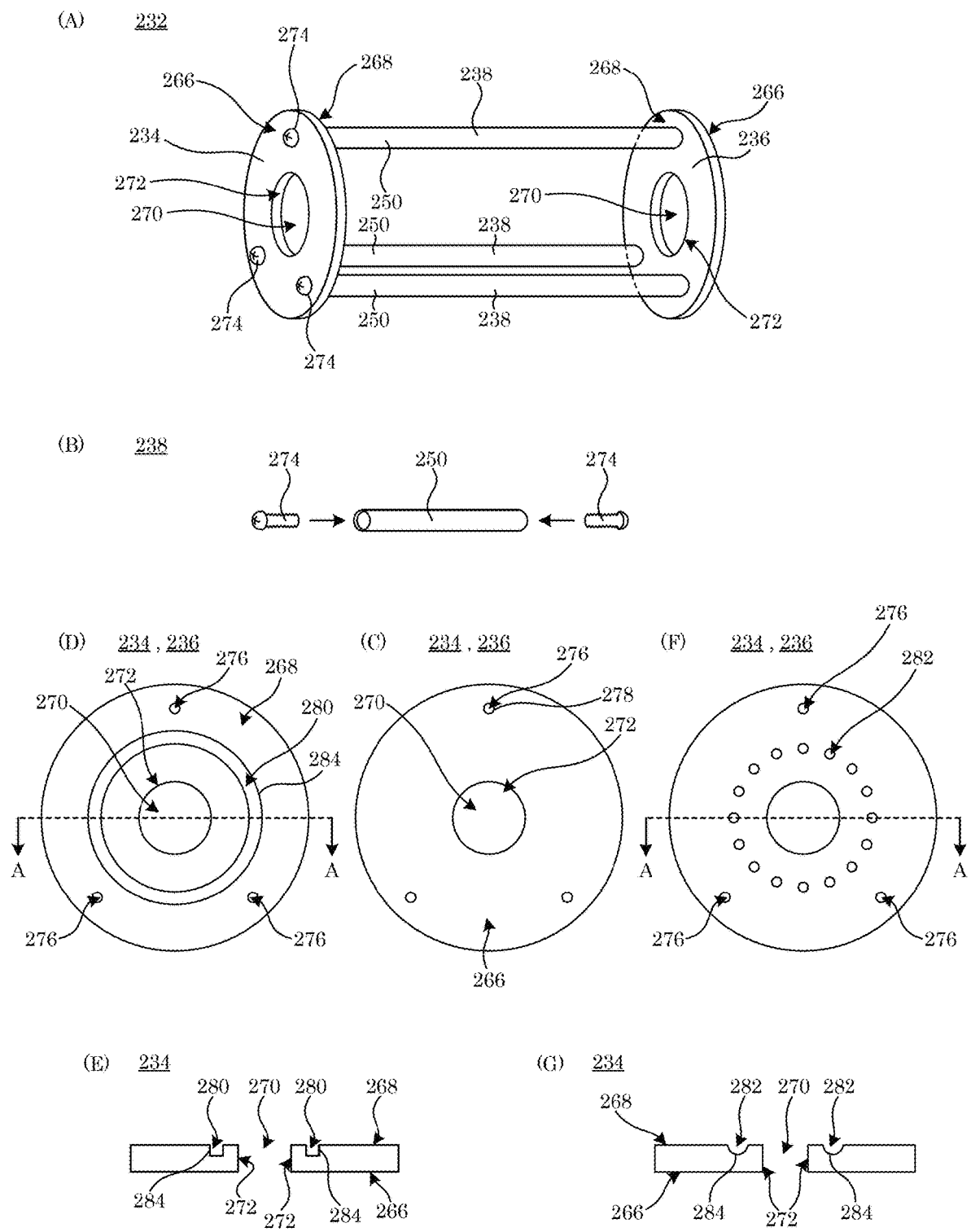
FIG. 8 shows a perspective view of a compression clamp 232 in panel A; shows a perspective view of a compression fastener 238 that includes a fixative 274 that is received by a spacer 250 in panel B; shows an outer surface 266 of a compression platen; shows an inner surface 268 of a compression platen that has a groove for receiving a gasket compression intermediary in panel D and a cross-section along line A-A of such in panel E; and shows an inner surface 268 of a compression platen that has a plurality of depressions for receiving spherical compression intermediaries in panel F and a cross-section along line A-A of such in panel G.

Compression clamp 232 readily holds and compresses cell 210 in optical reference cavity 200. With reference to FIG. 8, a plurality of spacers 250 are interposed between inner surfaces 268 of compression platens (234, 236). Spacer 250 can be attached to compression platens (234, 236) in various ways including a fastener such as fixative 274 (shown in panel B; e.g., a screw, bolt, rivet), adhesive, epoxy, and the like. It is contemplated that compression clamp 232 can be monolithic such that all components are a single piece, or individual components are joined together. Compression platens (234, 236) can include a plurality of apertures 276 bounded by walls 278 that receive fixative 274 for attaching spacers 250 to compression platens (234, 236). Further, compression platens (234, 236) include aperture 270 bounded by wall 272, wherein aperture 272 can receive a mirror (e.g., 228 or 230). Groove 280 can be disposed on the inner surface 268 of compression platen (234 or 236) to receive a compression intermediary (e.g., gasket 240 or 242). According to an embodiment compression platen (234, 236) includes a plurality of depressions 282 that receive a compression intermediary, e.g., spherical elastomers.

A diameter of aperture 270 in compression platen (234, 236) can be from 50 mm to 2 mm, specifically from 30 mm to 10 mm. Further, first compression platen 234 and second compression platen 236 compress cell 210 by exerting a compressive force on first end face 214 and second end face 216. The compressive force is exerted at radius Rc (see FIG. 4) from a central axis of the cell 210 so that the cell 210 is compressed by compression clamp 232, and length L of optical canal 218 is unperturbed to first order with a magnitude of the compressive force. Radius Rc can be selected in consideration, e.g., of results from finite element analysis of deformation of cell 210 under compressive force exerted upon first end face 214 and second end face 216 of cell 210 at various radii on faces (214, 216) and determining at which radius the compression of cell 210 cancels radial bulging of cell 210. It is contemplated that radius Rc can be from the radius of the mirror to the radius of the spacer. In an embodiment, compressing cell 210 at radius Rc produces a fractional length change of optical canal 218 from $-1\times10^{-18}$ $N^{-1}$ to $0$ $N^{-1}$ to prevent substantially all bulging or compressing of cell 210. Moreover, the compressive force is exerted at radius Rc can be from 15 mm to 24.5 mm.

Compression clamp 232 can be made from a low coefficient of thermal expansion material that provides an invariable expansion and contraction in response to a temperature change of compression clamp 232. The low coefficient of thermal expansion material can have a coefficient of thermal expansion from $5\times10$-7 K-1 (0.5 ppm/° C.) to $5\times10$-6 K-1. Exemplary materials for compression clamp 232 include a ceramic or metal alloy that can include, e.g., iron, nickel, cobalt, and the like such as invar, FeNi36 (64FeNi), Fe-33Ni-4.5Co (INOVCO), FeNi42 (e.g., NILO alloy 42), FeNiCo alloys (e.g., available as KOVAR OR DILVER P), and the like. Exemplary ceramics include pressed and sintered fused basalt powder (e.g., SITALL, also referred to as ASTROSITALL or SITALL CO-115M), a lithium-aluminosilicate glass-ceramic (e.g., ZERODUR), and the like.

Spacers 250 can have a length identical to length L of cell 210 and mechanically separate compression platens (234, 236). It is contemplated that spacers 250 have a fixed length or an adjustable length while maintaining rigidity and separation of compression platens (234, 236).

Figure 5:
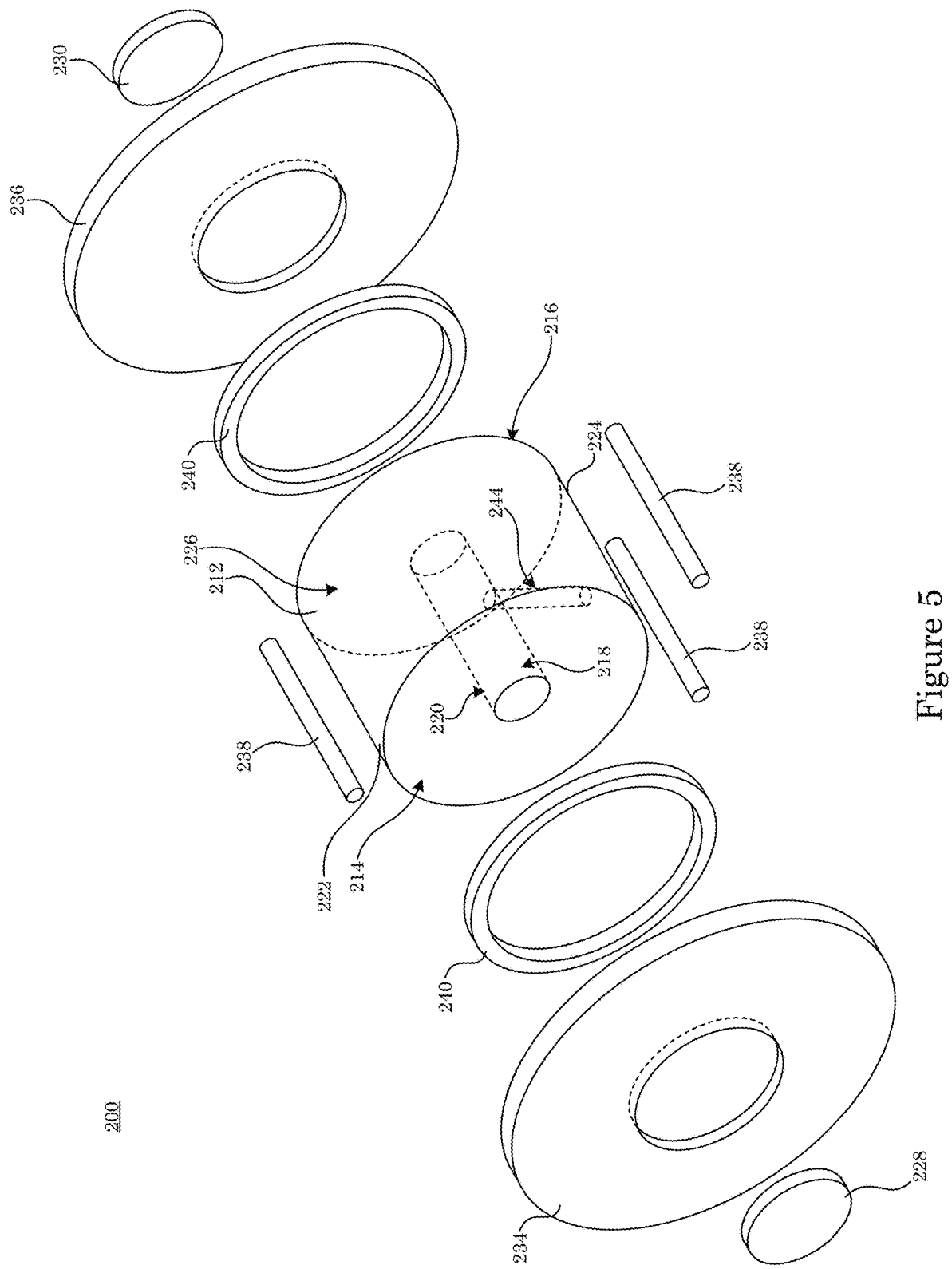
FIG. 5 shows an exploded view of an optical reference cavity 200.
Figure 6:
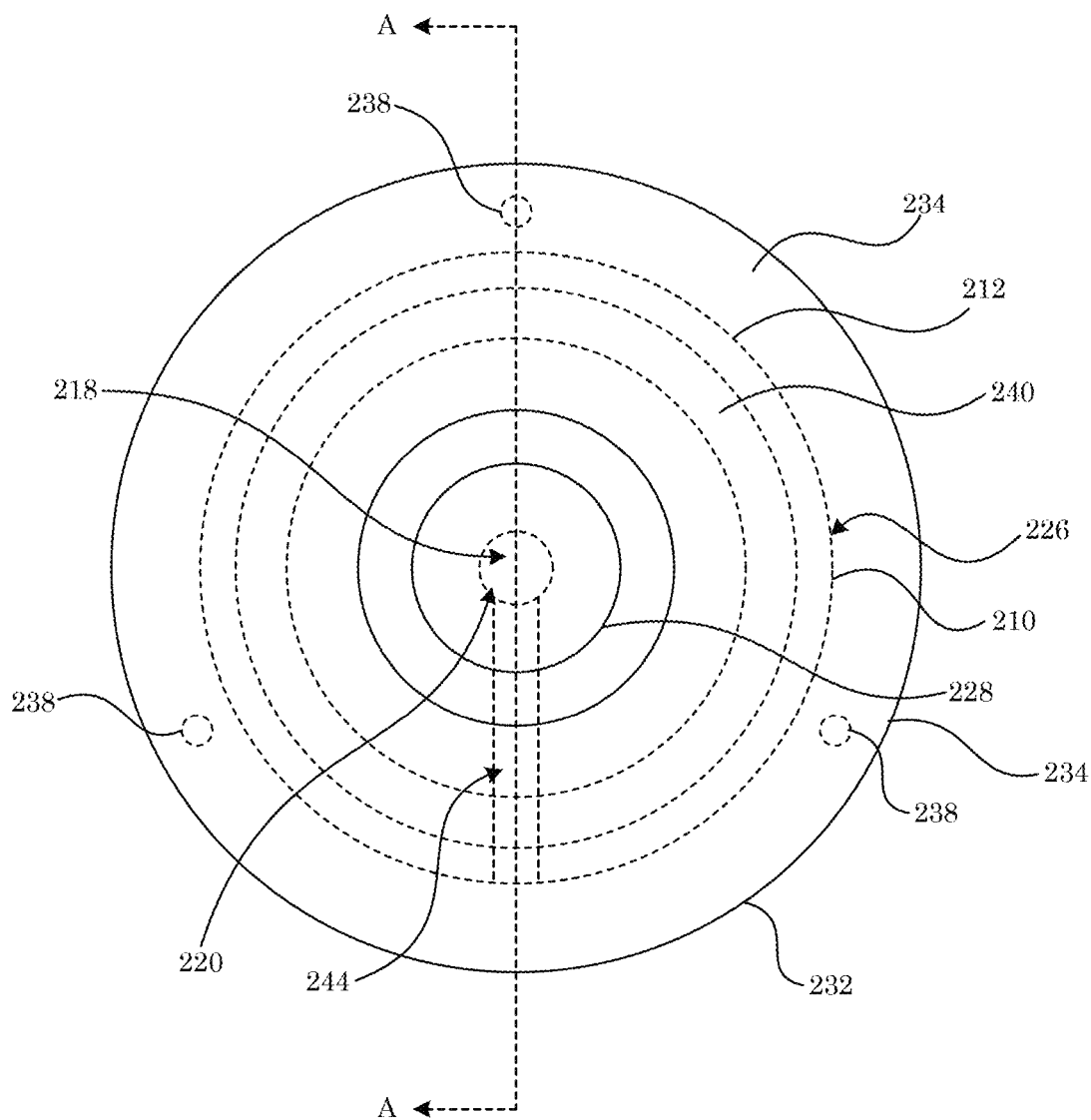
FIG. 6 shows an end view of the optical reference cavity 200 shown in FIG. 5.
Figure 7:
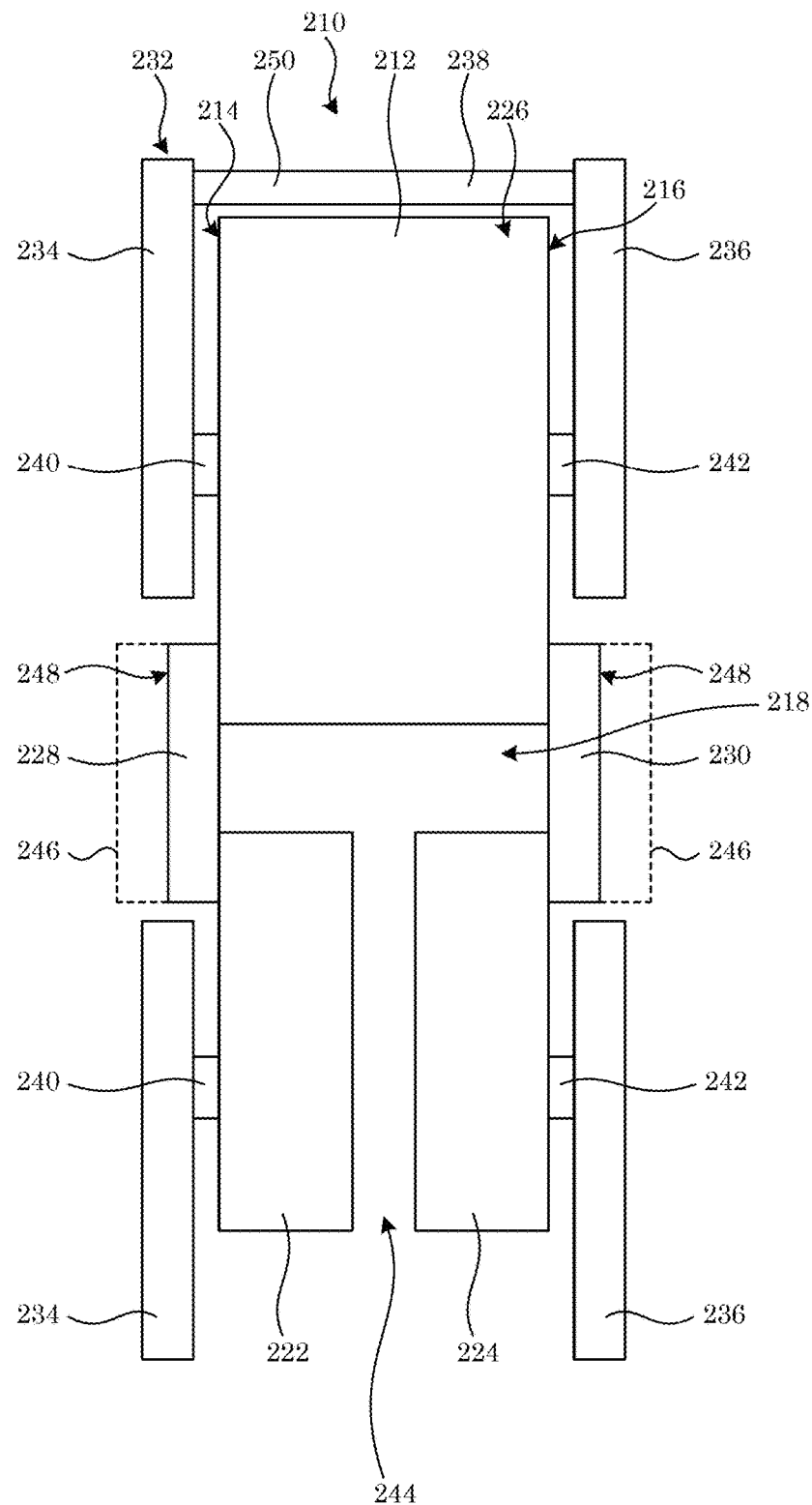
FIG. 7 shows a cross-section along line A-A of the optical reference cavity 200 shown in FIG. 6.

Compression intermediaries (240, 242) are interposed between compression platens (234, 236) and end faces (214, 216) of cell 210 to rigidly hold cell 210. First compression intermediary 240 and second compression intermediary 242 independently include a plurality of spherical spacers as shown in FIG. 1-4, a gasket as shown in FIG. 5-7, or a combination of the spherical spacer and gasket. The gasket and spherical spacers independently include an elastomer and the like.

Figure 9:
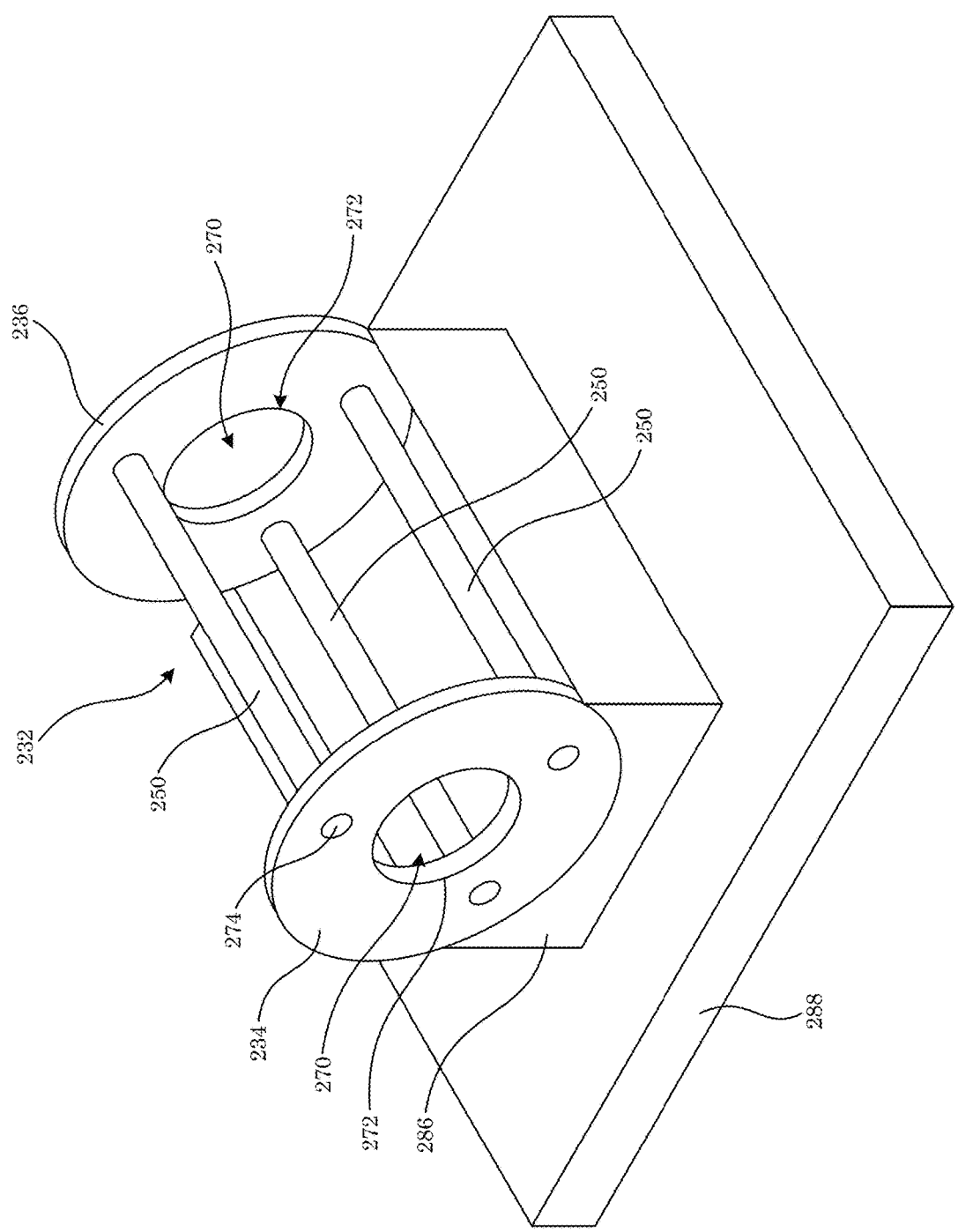
FIG. 9 shows the compression clamp 232 shown in FIG. 8 disposed on a mount 286 on a basal member 288.
Figure 10:
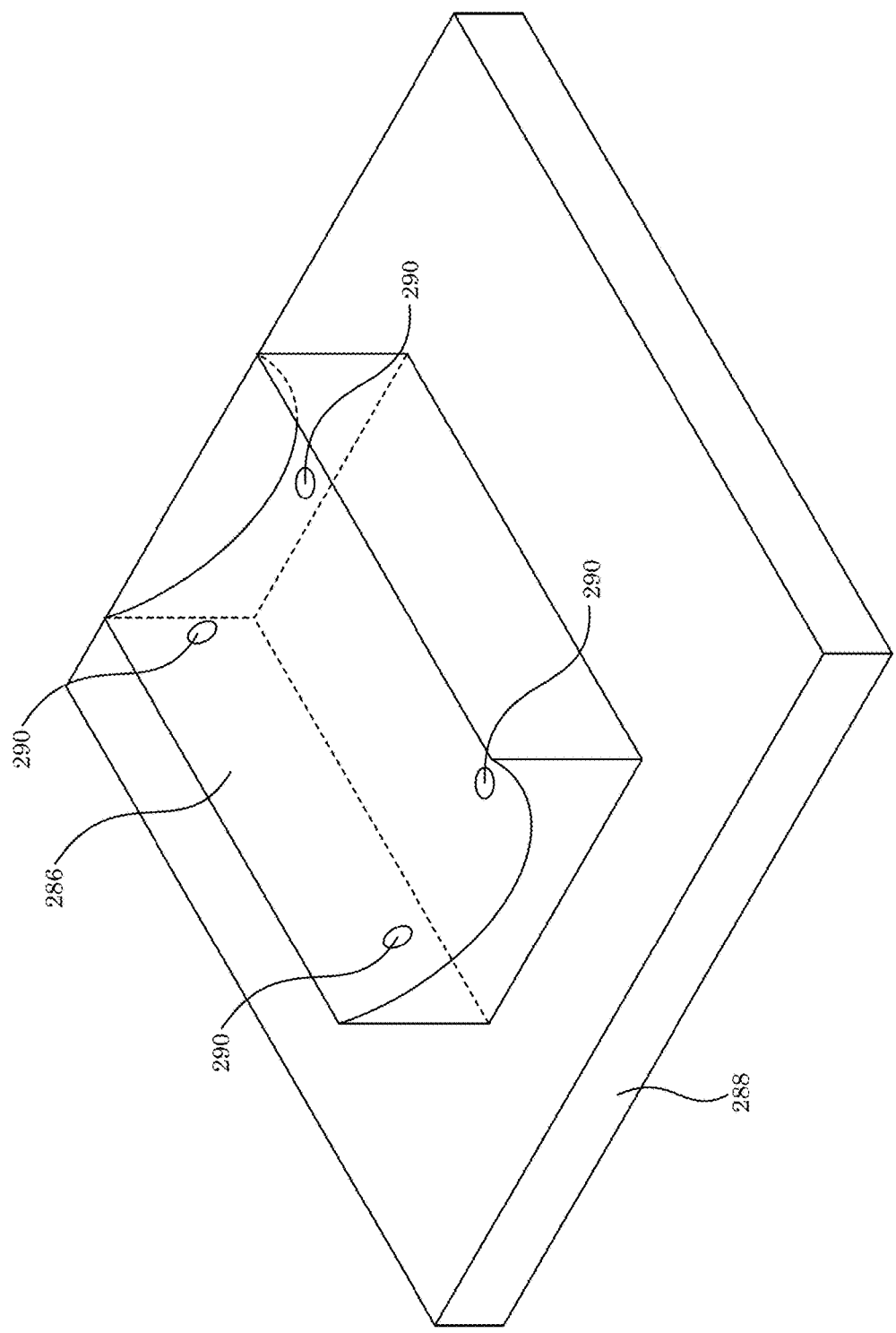
FIG. 10 shows show a perspective view of the mount 286 on the basal member 288 in an absence of the compression clamp 232.

With reference to FIG. 9 and FIG. 10, compression clamp 232 can be disposed on mount 286 with come e.g., a fastener such as a screw and disposed in mounting hole 290 of Mount 286. Mount 286 can be disposed on basal member 288 two mechanically coupled reference optical cavity 200 to an environment such as an inside of a vacuum chamber or other test facility.

Figure 11:
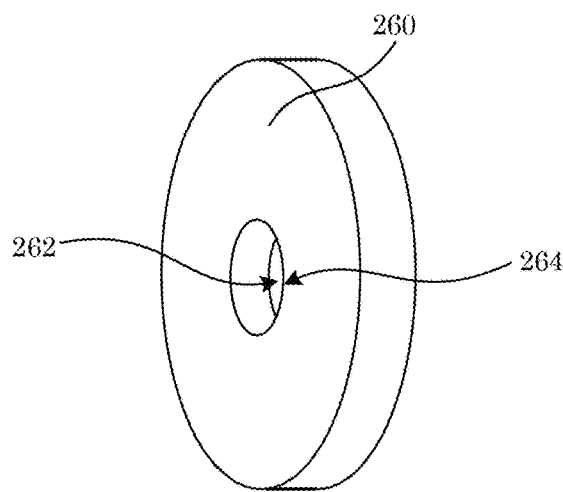
FIG. 11 shows a perspective view of a thermal expansion control ring 246 in panel A, a side view in panel B, and a cross-section along line A-A in panel C.
Figure 11:
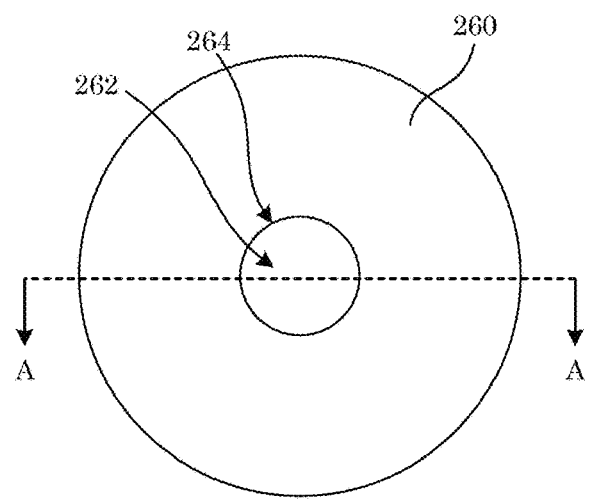
Figure 11:
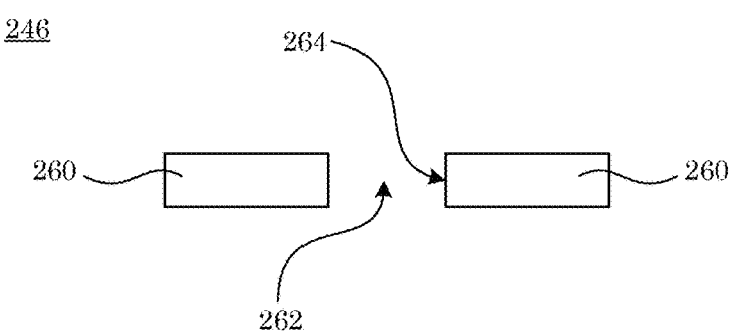

To overcome thermal changes in cell 210, with reference to FIG. 11, thermal expansion control rings 246 can be disposed on outer surface 248 of mirrors (228, 230). Thermal expansion control ring 246 can include substrate 260 in which is disposed aperture 262 bounded by wall 264. Aperture 262 unobstructively communicates laser light 256 into cell 210 and stabilization light 258 from cell 210.

Figure 21:
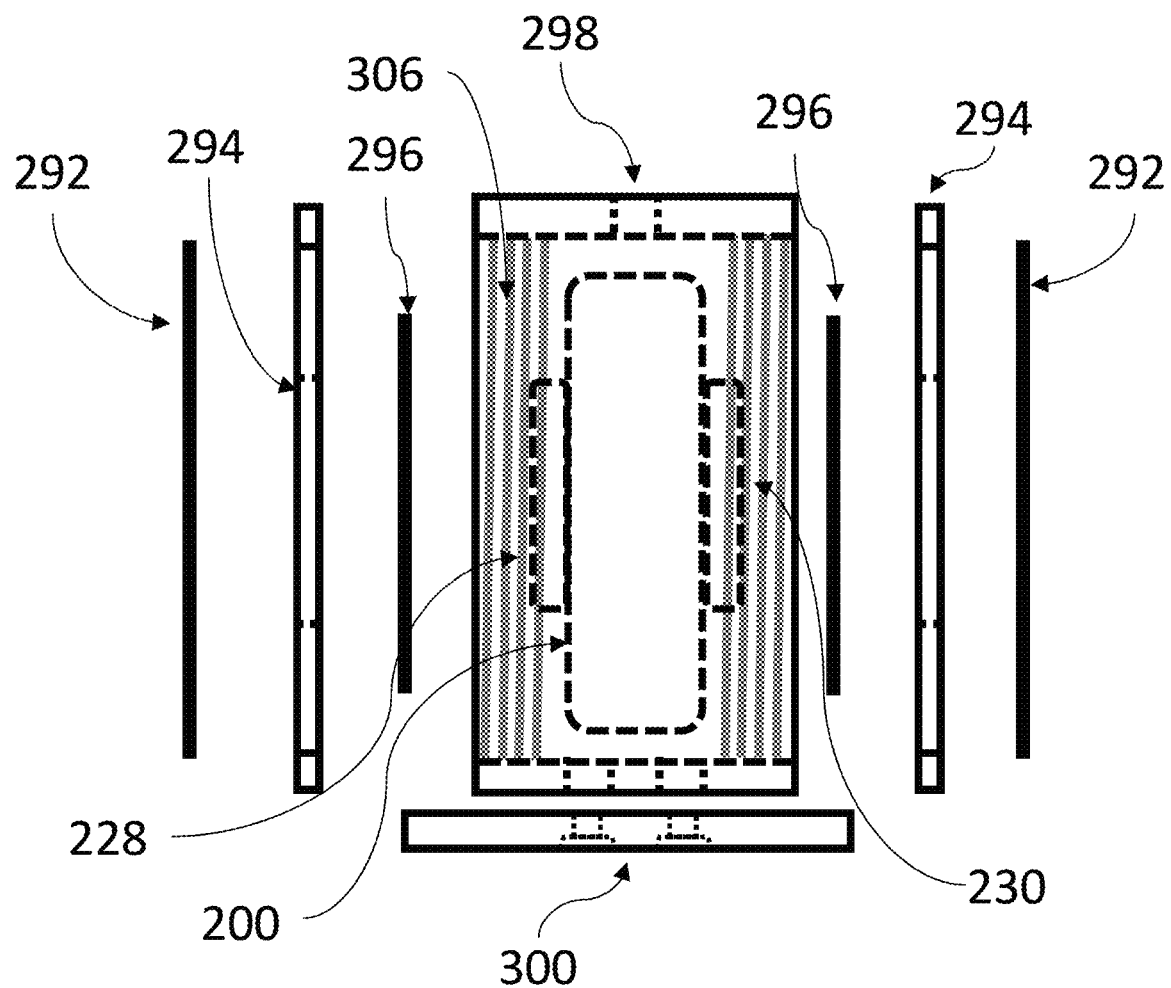
FIG. 21 shows an optical reference cavity.
Figure 22:
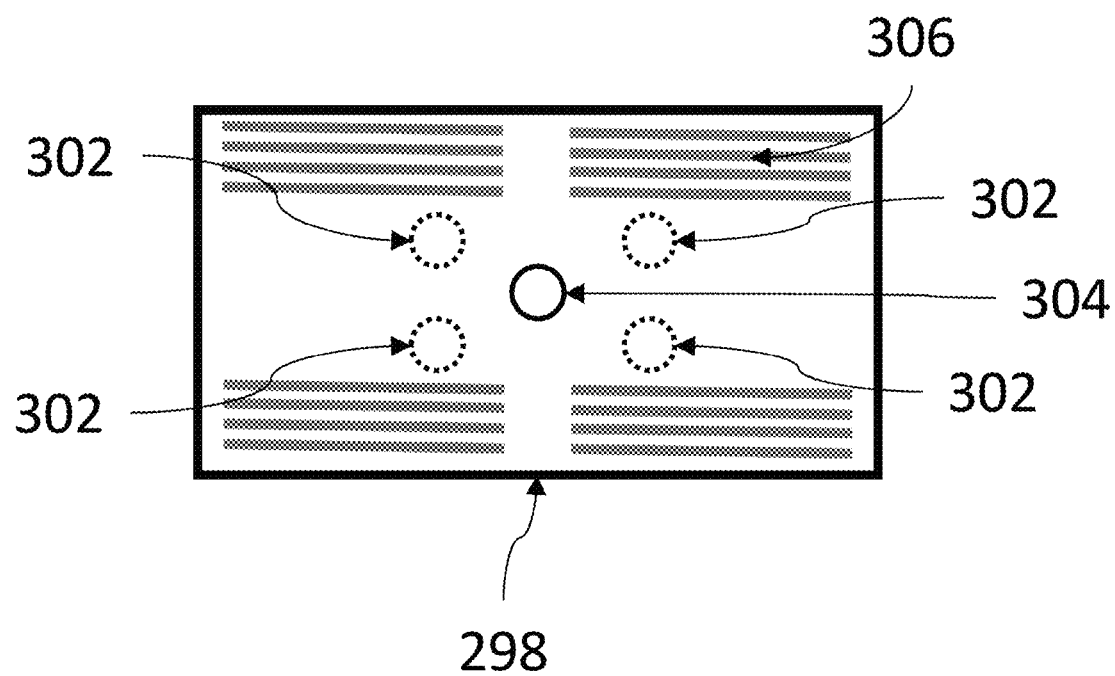
FIG. 22 shows a top view of the cavity housing shown in FIG. 21.
Figure 23:
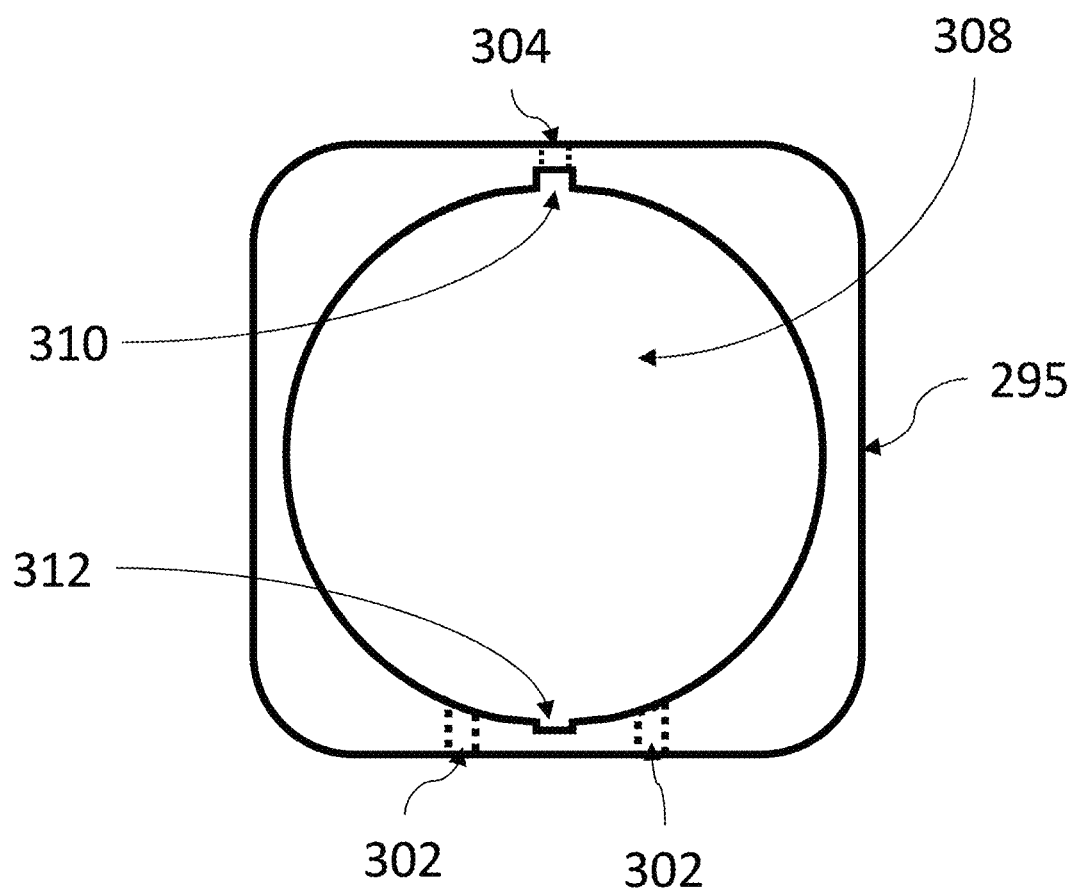
FIG. 23 shows a front view of the cavity housing shown in FIG. 22.
Figure 24:
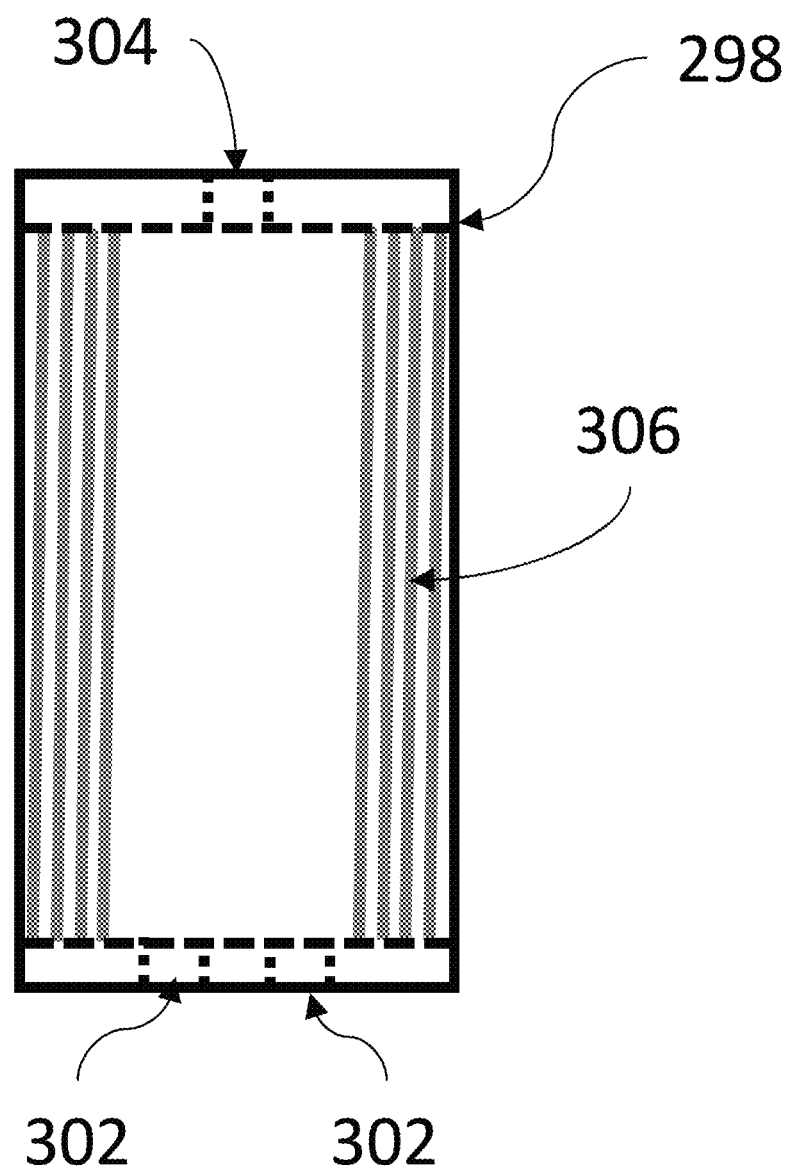
FIG. 24 shows a side view of the cavity housing shown in FIG. 21.
Figure 25:
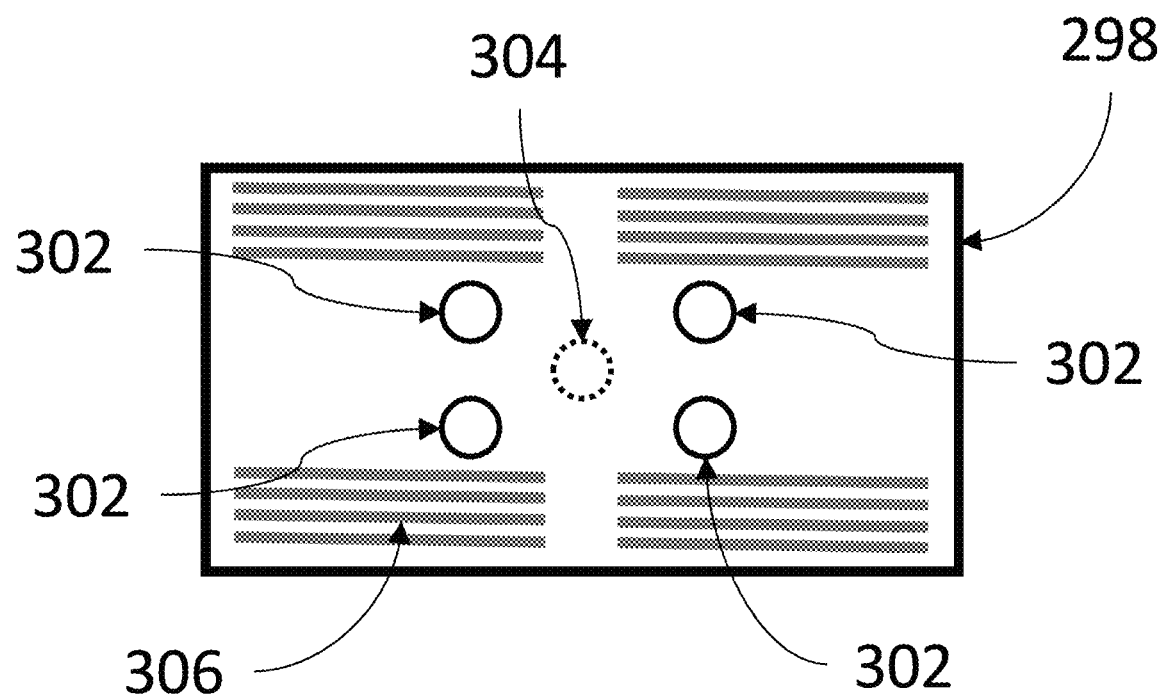
FIG. 25 shows a bottom view of the cavity housing shown in FIG. 21.
Figure 26:
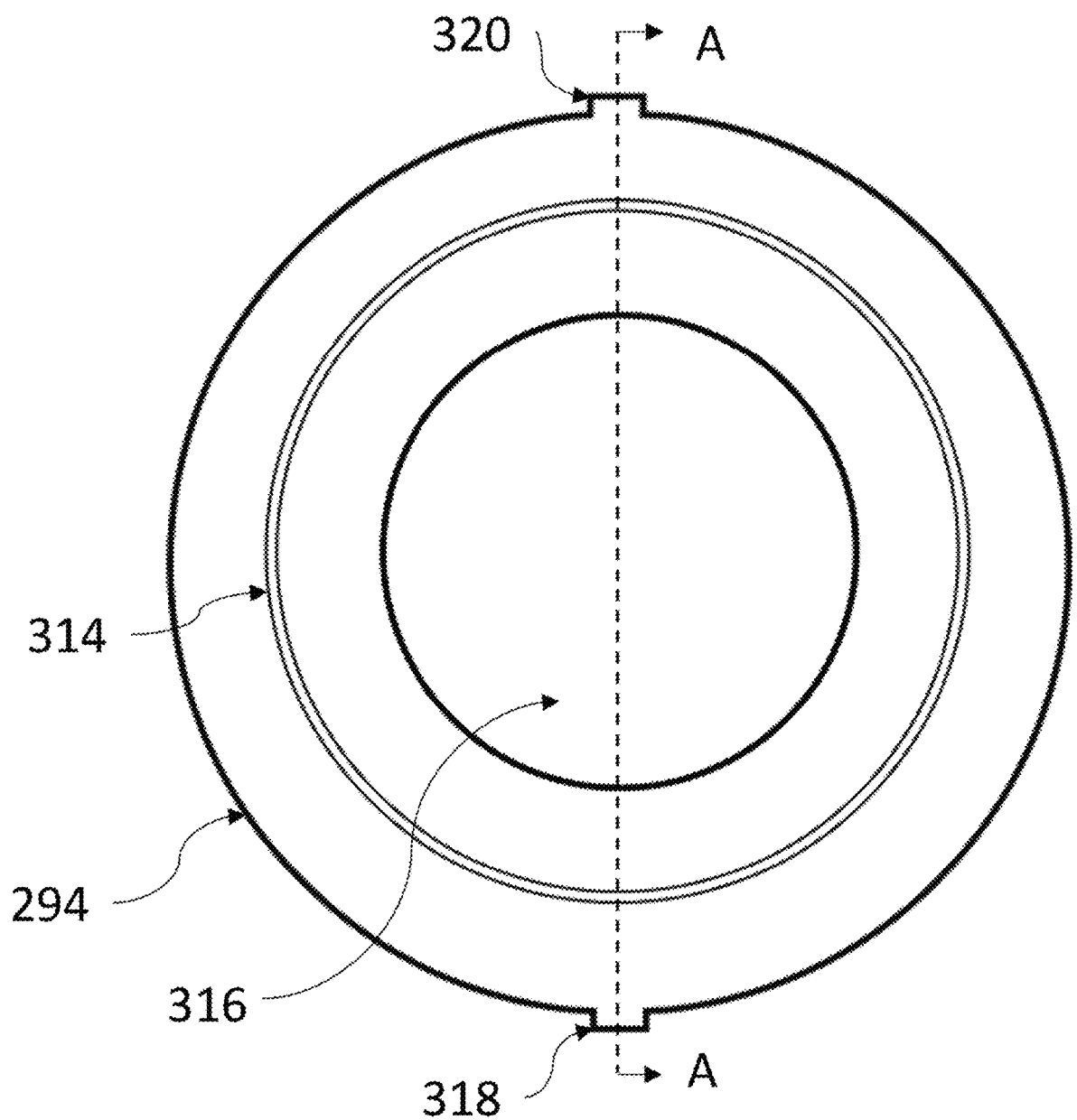
FIG. 26 shows a front view of a holding disc for the cavity housing shown in FIG. 21.
Figure 27:
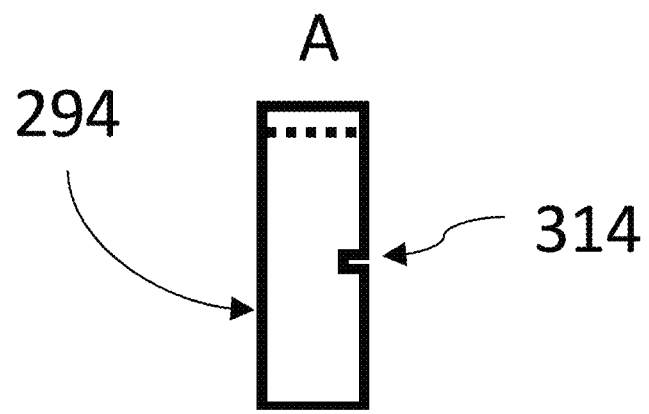
FIG. 27 shows a cross-section of the holding disc shown in FIG. 26.
Figure 27:
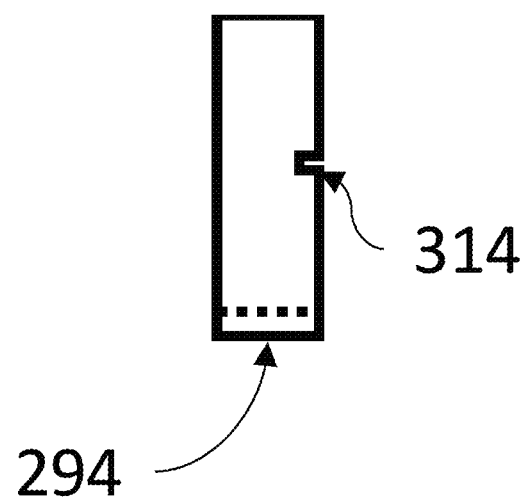
Figure 28:
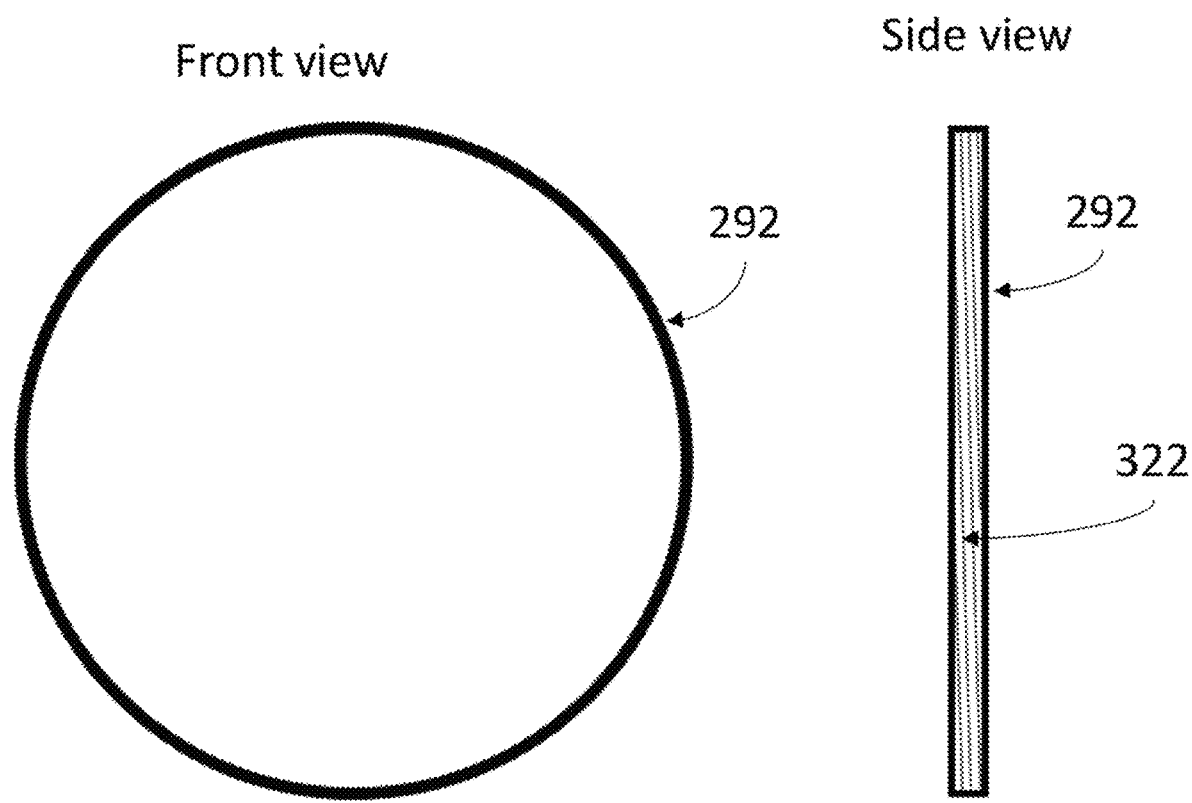
FIG. 28 shows views of a retaining ring for the cavity housing shown in FIG. 21.
Figure 29:
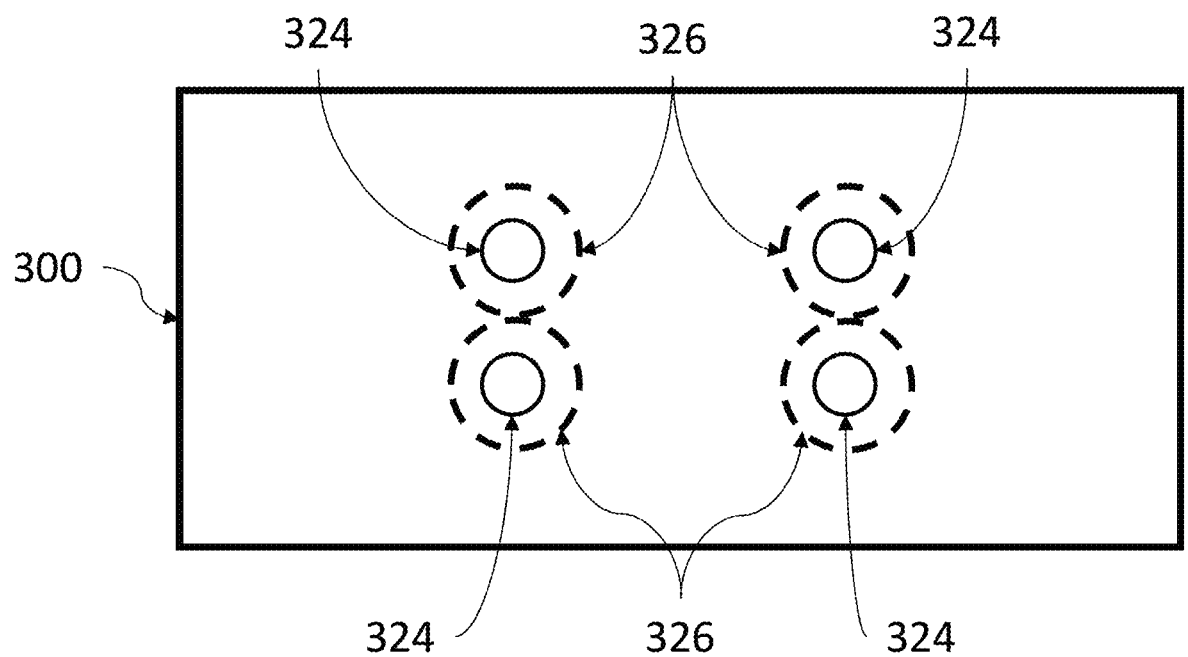
FIG. 29 shows a stand-off for the cavity housing shown in FIG. 21.
Figure 30:
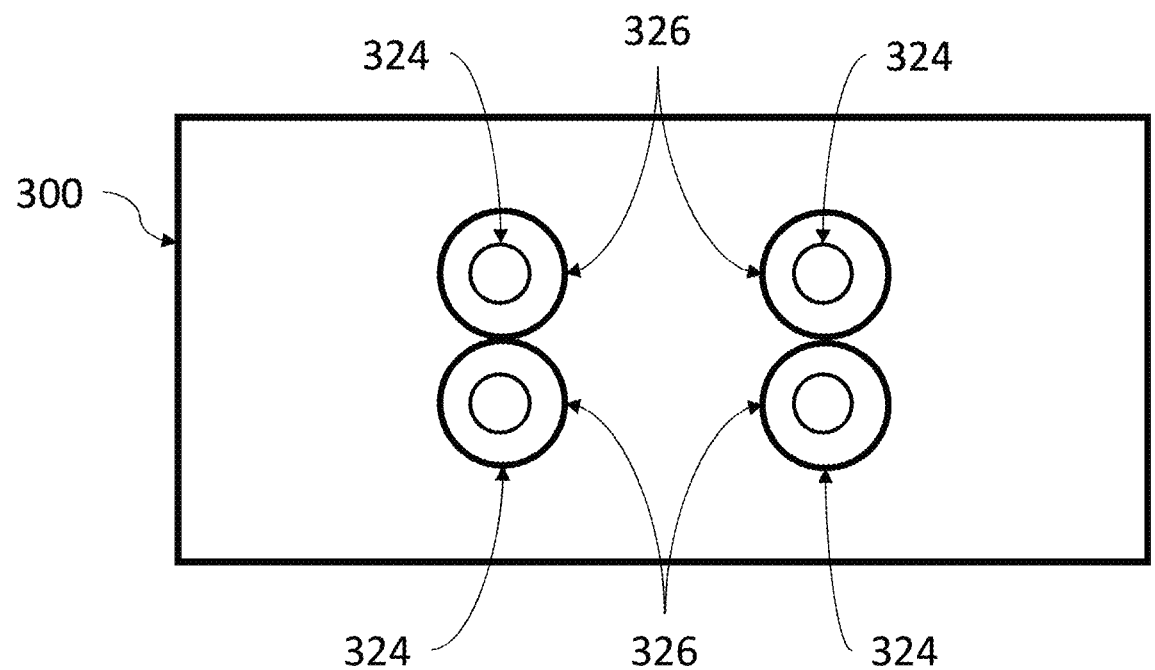
FIG. 30 shows a bottom view of the stand-off shown in FIG. 29.
Figure 31:
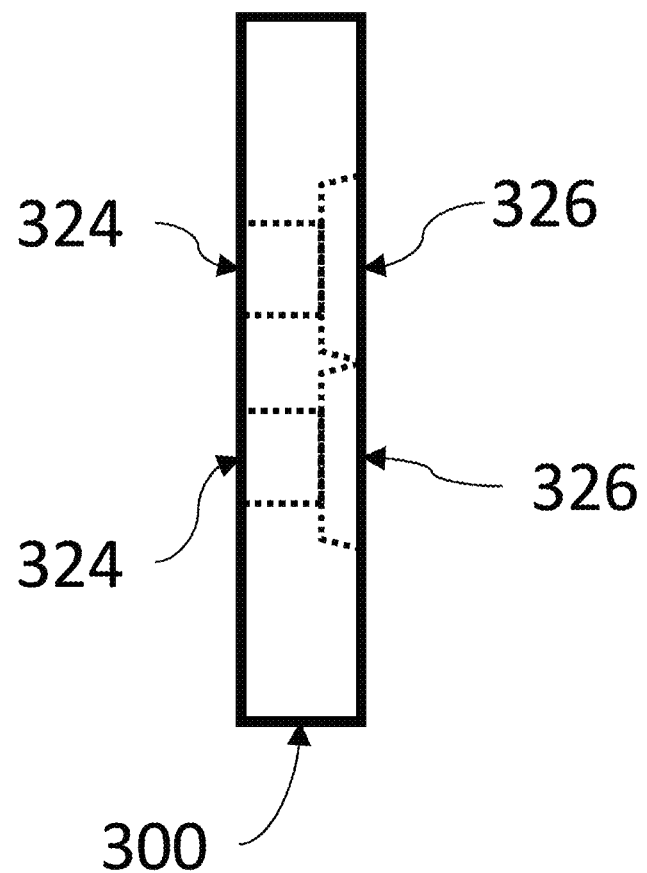
FIG. 31 shows a side view of the stand-off shown in FIG. 29.
Figure 32:
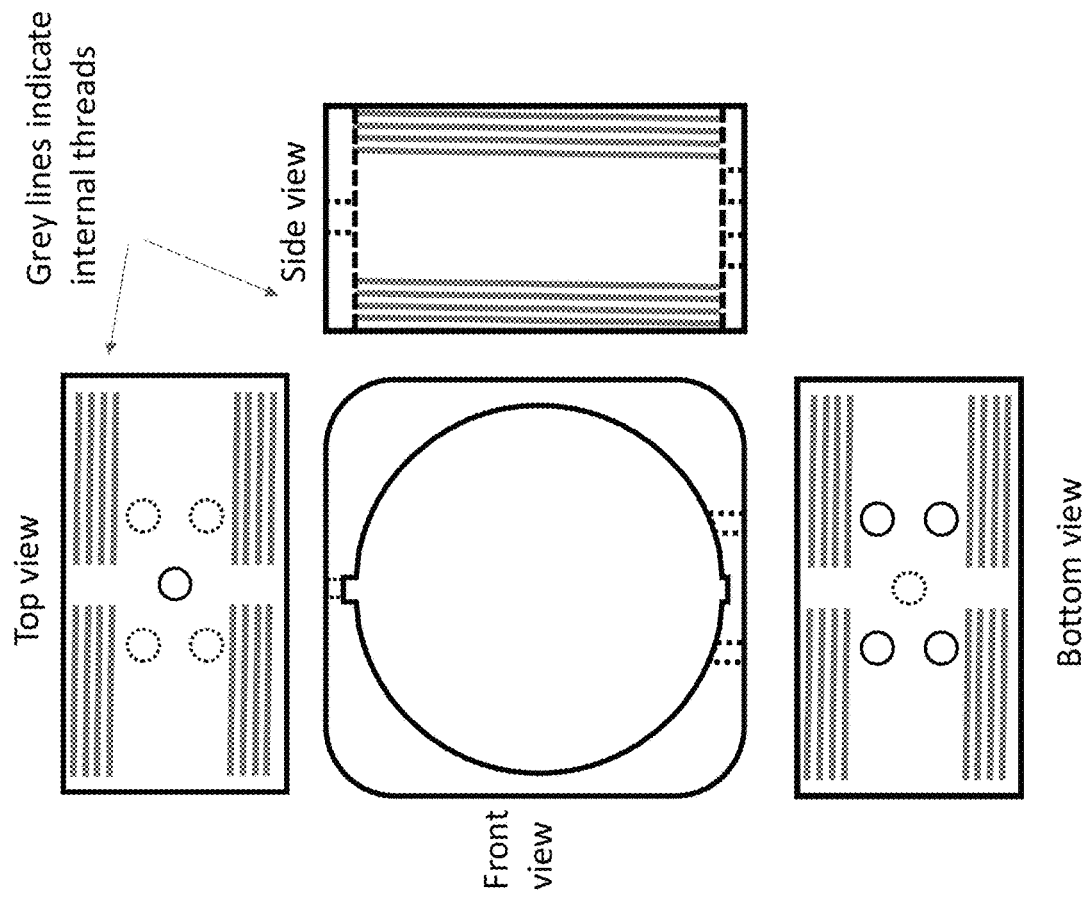
FIG. 32 shows a perspective view of the cavity housing shown in FIG. 21.
Figure 32:
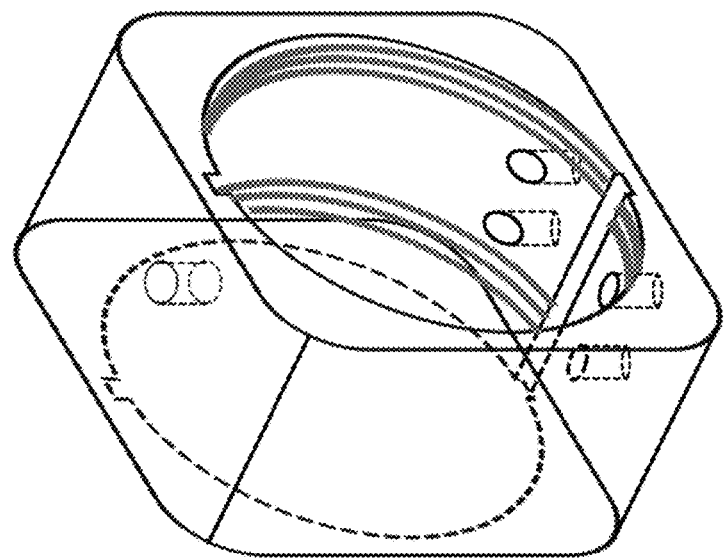
Figure 33:
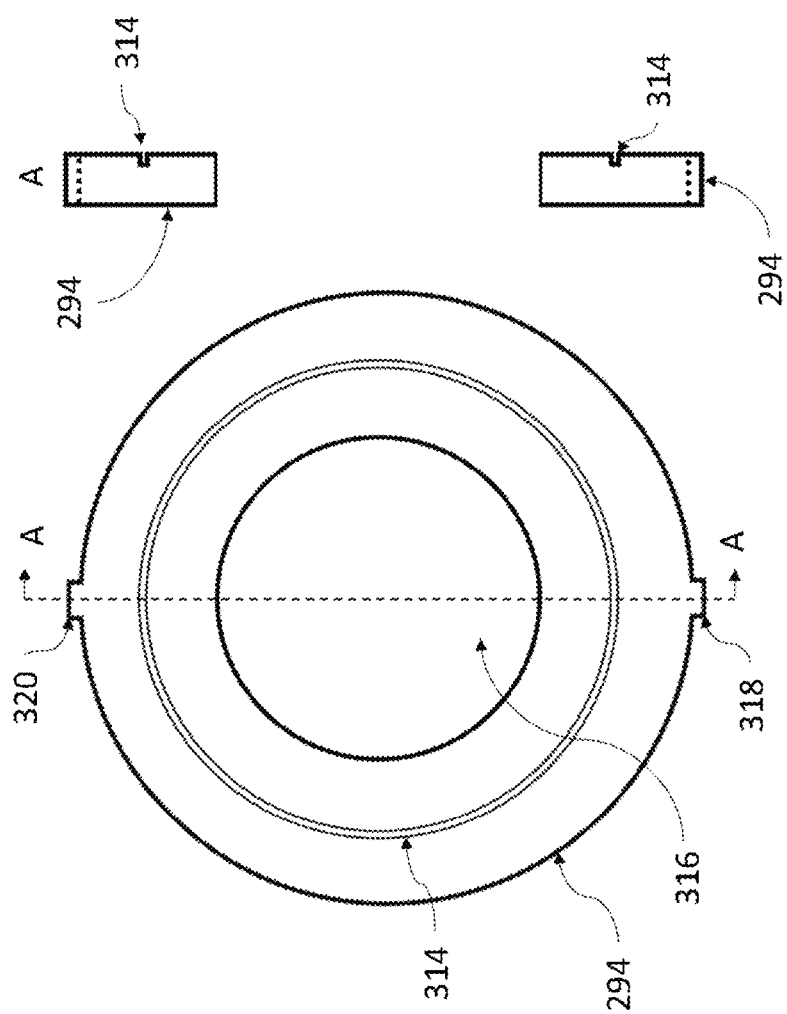
FIG. 33 shows a perspective of a holding disc.
Figure 33:
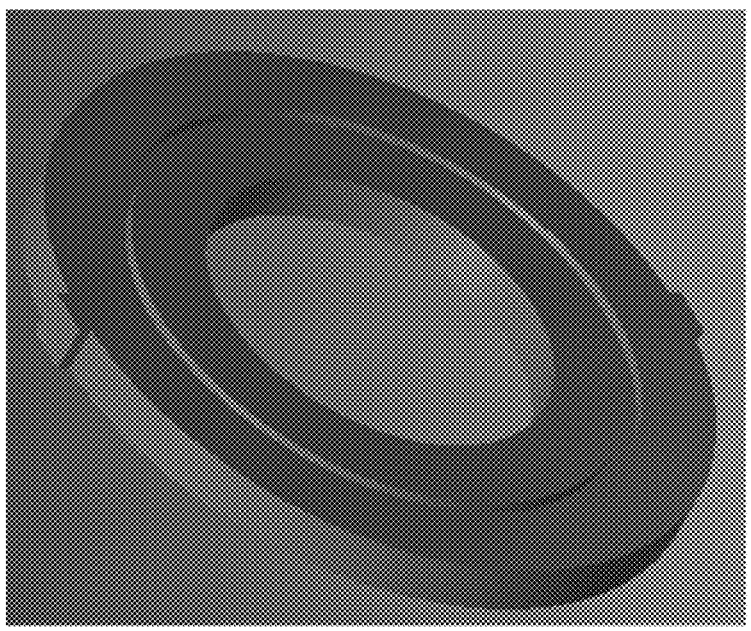
Figure 34:
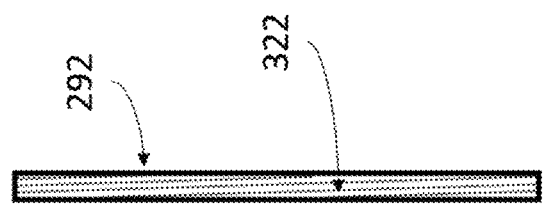
FIG. 34 shows views of a retaining ring.
Figure 34:
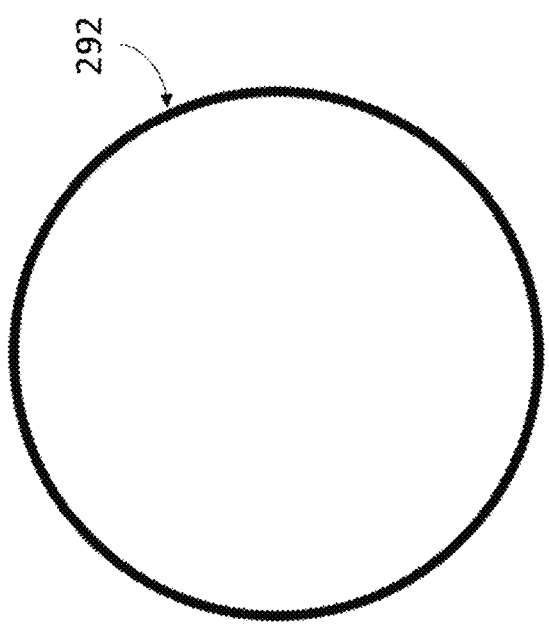
Figure 34:
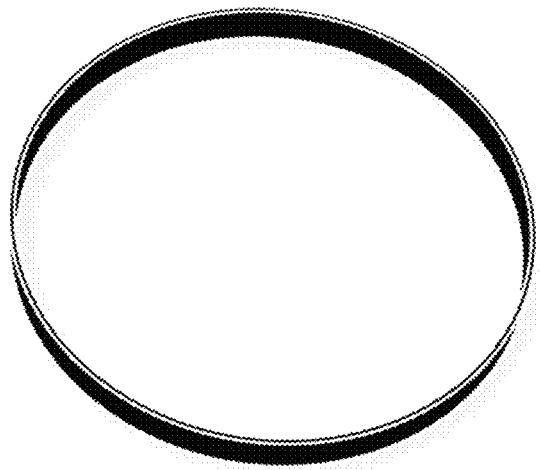
Figure 35:
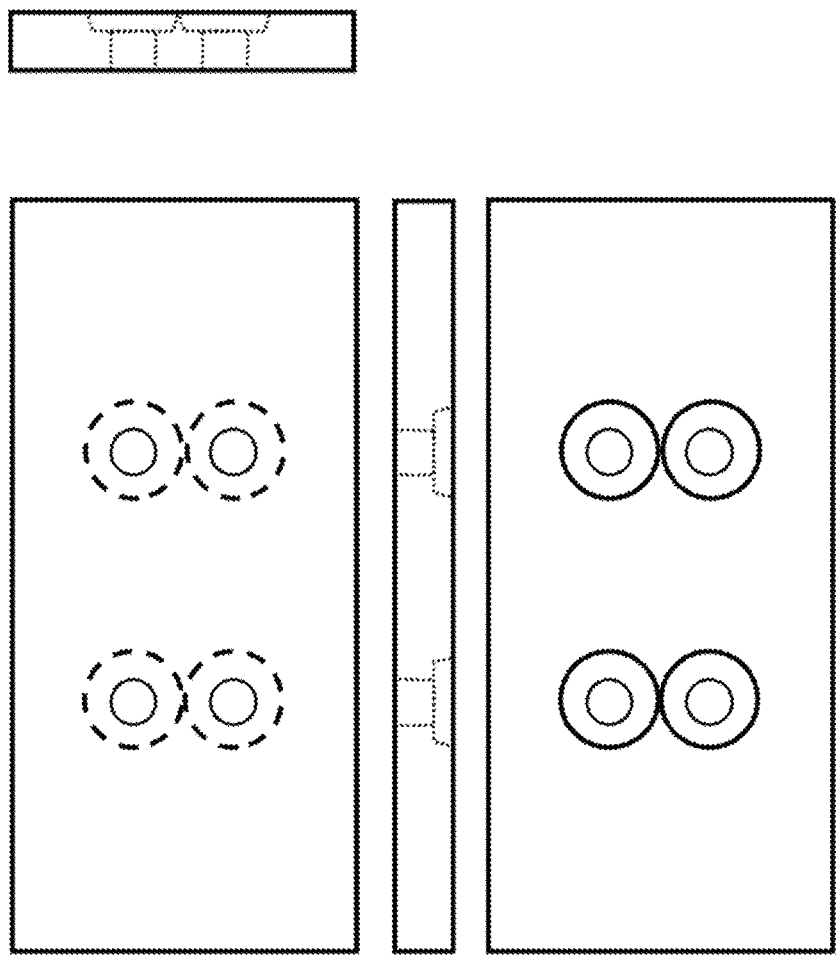
FIG. 35 shows views of a thermally insulating stand-off.
Figure 35:
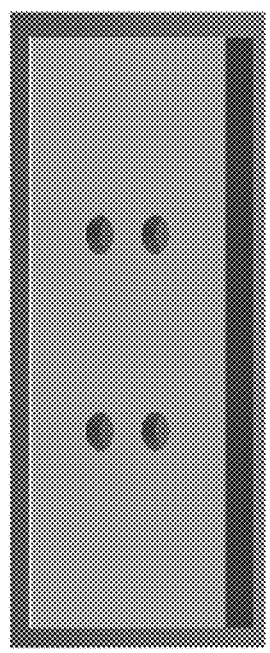
Figure 36:
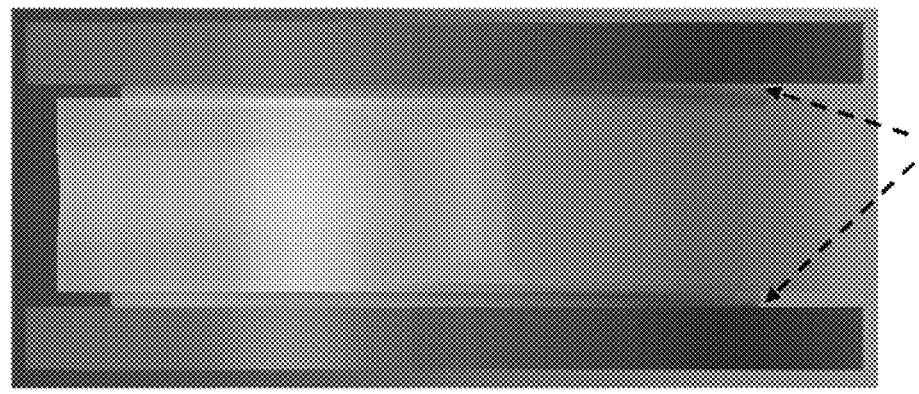
FIG. 36 shows views of an optical reference cavity.
Figure 36:
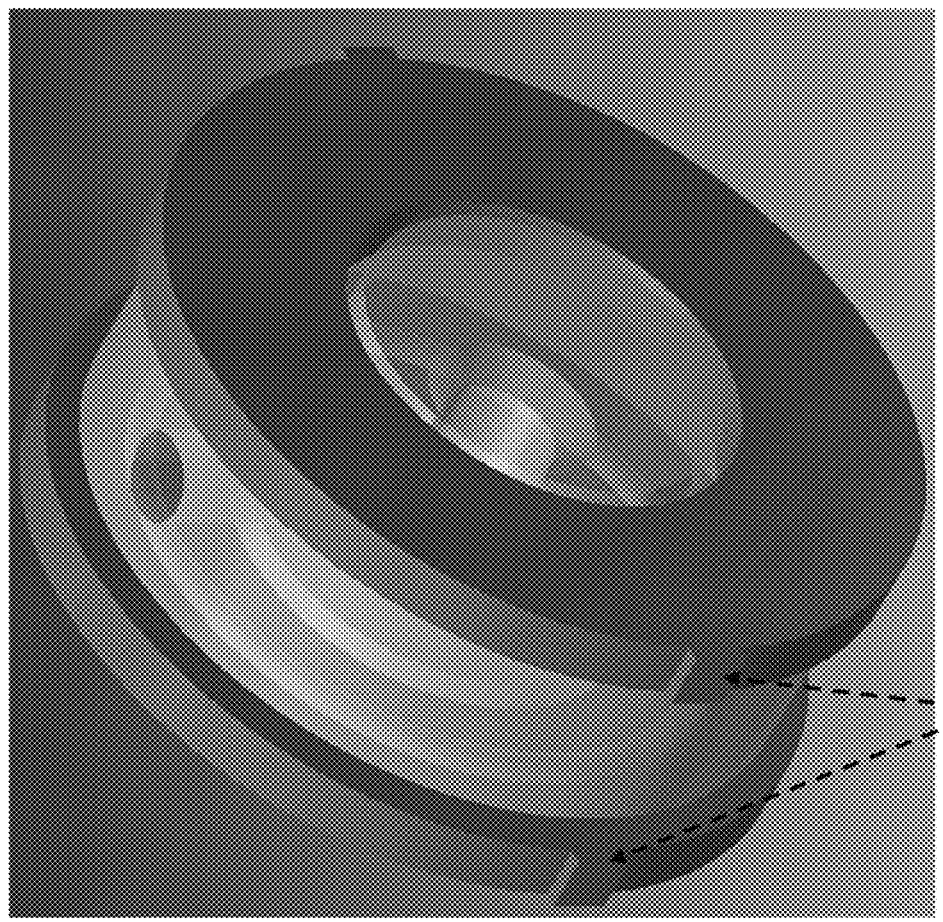
Figure 37:
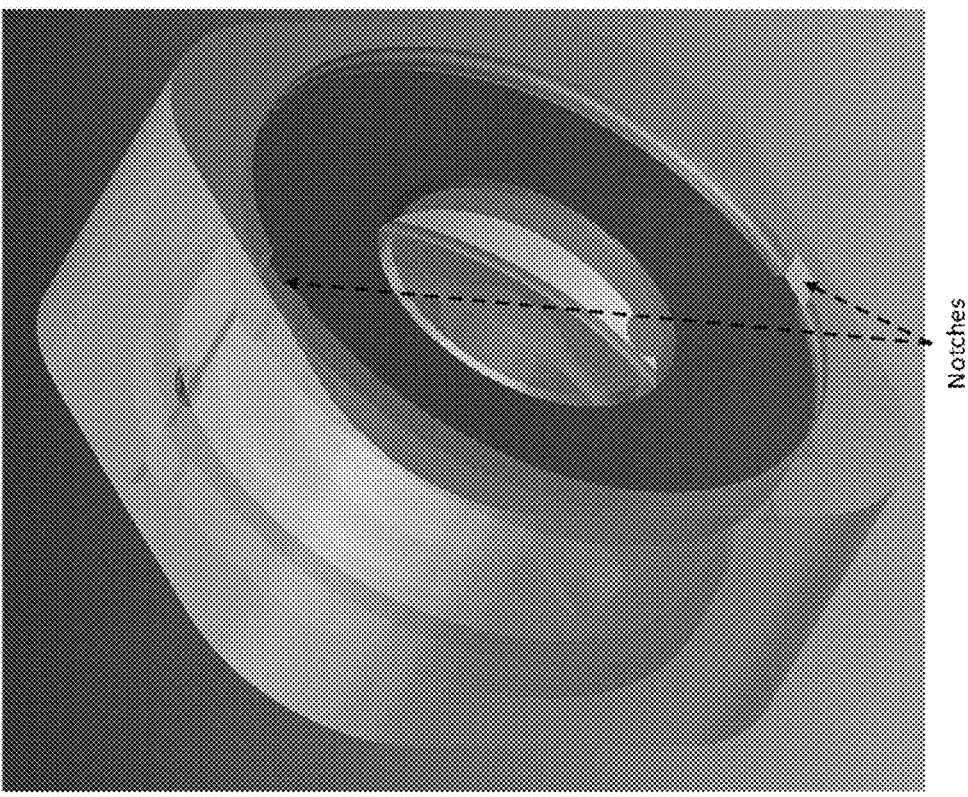
FIG. 37 shows views of an optical reference cavity.
Figure 37:
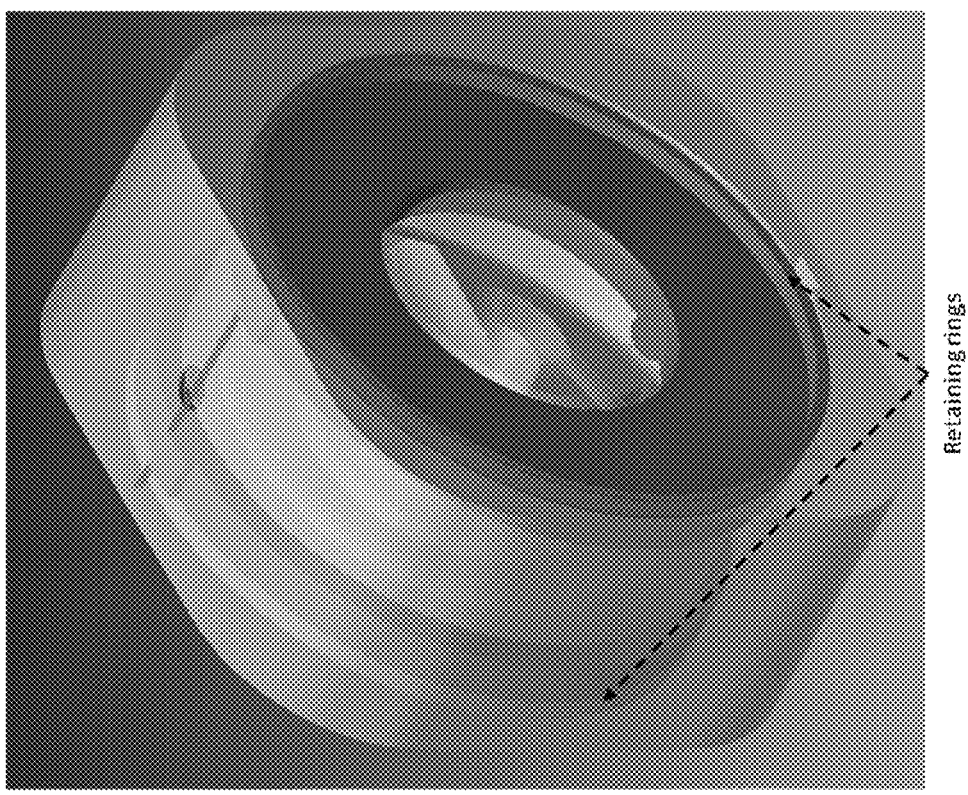

In an embodiment, with reference to FIG. 21, compression clamp 232 holds cell 210 and includes compression intermediaries (240,242), holdings discs 294, and retaining rings 292 are placed inside aperture 308 of the cavity housing 298. Two compression intermediaries are interposed between the inner surfaces of the holding discs. Retaining rings 292 contact with the outer surfaces of holding discs 294. With reference to FIG D and FIG H, threads 322 on the outer surface of retaining rings 292 are joined to threads 306 on the inner surface of aperture 298 of cavity housing 295.

Cavity housing 298, holding discs 294, and retaining rings 292 can be made from a low coefficient of thermal expansion material that provides an invariable expansion and contraction in response to a temperature change of cavity housing 298, holding discs 294 or retaining rings 292. The low coefficient of thermal expansion material can have a coefficient of thermal expansion $5 \times 10^{-7}$ $K^{-1}$ (0.5 ppm/C) to $5 \times 10^{-6}$ $K^{-1}$. Exemplary materials for cavity housing 298, retaining rings 292, and holding discs 294 include a ceramic or metal alloy that can include, e.g., iron, nickel, cobalt, and the like such as invar, FeNi36 (64FeNi), Fe-33Ni-4.5Co (INOVCO), FeNi42 (e.g., NILO alloy 42), FeNiCo alloys (e.g., available as KOVAR OR DILVER P), and the like. Exemplary ceramics include pressed and sintered fused basalt powder (e.g., SITALL, also referred to as ASTROSITALL or SITALL CO-115M), a lithium-aluminosilicate glass-ceramic (e.g., ZERODUR), and the like.

With reference to FIG C and FIG F, cavity housing may include notches 310 and 312 within aperture 308. Notches 310 and 312 align with tabs 318 and 320 of holding discs 294 of FIG x. Holding discs 294 may include groove 314 for fixing a gasket compression intermediary at the desired holing radius Rc. Alternatively, a plurality of spherical intermediaries may be used.

With reference to FIG A and FIG I, cavity housing 294 may be disposed on stand-off 300 by way of a fasteners such as screws in mounting holes 324 of stand-off 300.

In an embodiment, with reference to FIG. 15, optical reference cavity 200 is disposed in stabilized laser system 252. Here, stabilized laser system 252 producing ultra-low-noise optical radiation and includes laser 254. Laser 254 produces laser light 256, receives stabilization light 258 from optical reference cavity 200; and locks to stabilization light 258 so that laser light 256 is ultra-low-noise optical radiation. Optical reference cavity 200 is in optical communication with laser 254 and receives laser light 256 from laser 254, produces stabilization light 258, communicates stabilization light 258 to laser 254.

Laser 254 can include semiconductor, fiber, solid state designs, and can be used directly or employed in an optical, acousto-optical or electro-optical system that creates the desired wavelength, provides the desired power, polarization state, stability or linewidth, such as optical gain, or nonlinear frequency shifting. Moreover, the phase, frequency or power of laser 254 can be modulated, directly or externally, to assist in stabilization to the reference cavity. Laser 254 produces laser light 256. Laser light 256 can have a wavelength from 578 nm to 1550 nm. An optical power of laser light 256 can be from 100 mW to 1 mW. Moreover, laser light 256 is continuous-wave, and consists of a single longitudinal mode. In an embodiment, laser light 256 has a power of 25 mW, operating at a wavelength of 1070 nm, with single longitudinal mode operation.

In response to receipt of laser light 256 from laser 254, optical cavity reference 200 produces stabilization light 258. Stabilization light 258 can have a wavelength from 578 nm to 2000 nm, specifically from 1000 nm to 1550 nm. An optical power of stabilization light 258 can be from 10 mW to 0.001 mW, specifically from 5 mW to 0.005 mW, and more specifically from 2.5 mW to 0.01 mW. Moreover, stabilization light 258 may be phase-modulated and of constant power. In an embodiment, stabilization light 258 has a constant power of 0.010 mW, operating at a wavelength of 1070 nm, with phase modulation sidebands at 8 MHz offset from the central frequency of the laser.

Stabilization light 258 from optical reference cavity 200 can be received by detector 260. Detector 260 can include a photodiode to detect the light and convert it to an electrical signal, followed by an amplifier to increase the power of the electrical signal. Moreover, the electrical signal derived from the photodiode may be compared to a phase or frequency reference to generate a differential error signal to be communicated to laser 254. In an embodiment, detector 260 includes a low noise InGaAs photodiode and a low noise, high gain transimpedance amplifier, a frequency mixer to multiply the signal from the photodiode with a phase reference, and a loop filter to condition the error signal communicated to laser 254. Detector 260 produces stabilization signal 262 from stabilization light 258. Stabilization signal 262 is communicated from detector 260 to laser 254, which locks to stabilization signal 262 in a feedback loop as shown in FIG. 15.

The stabilized laser system 252 can have a laser phase noise that is nearly thermal noise limited from 1 Hz offset to 1 kHz offset and provides 10 GHz generation with phase noise at $-100$ dBc/Hz at 1 Hz offset and $<-173$ dBc/Hz for offsets greater than 600 Hz. The fractional frequency stability reaches $2 \times 10\text{-}152 \times 10\text{-}15$ at 0.1 s of averaging. Advantageously, stabilized laser system 252 has a fractional frequency stability of $2 \times 10\text{-}15$ at 0.1 s of averaging.

Optical reference cavity 200 can be made in various ways. In an embodiment, a process for making optical reference cavity 200 includes disposing first mirror 228 on first end face 214 of cell 210; disposing second mirror 230 on second end face 216; optionally disposing thermal expansion control ring 246 on first mirror 228; optionally disposing thermal expansion control ring 246 on second mirror hundred 30; disposing cell 210 between first compression platen 234 and second compression platen 236; interposing first compression intermediary 240 between first compression platen 234 and cell 210; interposing second compression intermediary 242 between second compression platen 236 and cell 210; attaching spacers 250 to first compression platen 234 and second compression platen 236 to make optical reference cavity 200.

In an embodiment, a process for making stabilized laser system 252 includes disposing optical reference cavity 200 in optical communication with laser 254; disposing detector 260 in optical communication with optical reference cavity 200; and providing electrical communication between detector 260 and laser 254.

Optical reference cavity 200 has numerous advantageous and unexpected benefits and uses. In an embodiment, a process for producing stabilization light 258 includes fiber laser producing 25 mW of optical power impinging on an acousto-optic modulator (AOM) that shifts the laser frequency to a resonance of the optical cavity. After passage through the AOM, the light is received by an electro-optic modulator (EOM) that imposes phase modulation on the laser light, resulting in frequency sidebands symmetric about the original laser frequency, with frequency separation greater than the linewidth of the optical resonant cavity. Phase modulation frequency is provided by an electronic frequency synthesizer that along with the laser light. After passage through the EOM, the light is received by the optical reference cavity where the non-resonant phase modulation sidebands are reflected, then send to detector 260. The phase shift of the phase modulation sidebands upon reflection from the optical reference cavity provides an electrical signal that is used to stabilize the laser frequency to the optical reference cavity. Stabilization is realized by electrically mixing the photo-detected electrical signal with frequency synthesizer used in the generation of the phase modulation sidebands. The result of the frequency mixing is a voltage signal that can be applied directly to the source laser or the AOM, resulting in frequency stabilization of light 256.

Moreover, optical reference cavity 200 and processes herein have numerous advantageous properties. In an aspect, optical reference cavity 200 provides portability of a system with high frequency stability and low phase noise, whereas other systems with comparable performance are not portable, or are of more complicated geometry.

Optical reference cavity 200 and processed herein embodies a highly symmetric cylindrical geometry, unexpectedly yielding a high rejection of vibration-induced instabilities in a simple, easy to manufacture design.

The articles and processes herein are illustrated further by the following Example, which is non-limiting.

Example

Compact, thermal-noise-limited reference cavity for ultra-low-noise microwave generation.

An easy-to-manufacture 25-mm-long ultra-stable optical reference cavity for transportable photonic microwave generation systems has a rigid holding geometry that is first-order insensitive to the squeezing force and a cavity geometry that improves the thermal noise limit at room temperature. A laser phase noise is nearly thermal noise limited for three frequency decades (1 Hz to 1 kHz offset) and supports 10 GHz generation with phase noise near −100 dBc/Hz at 1 Hz offset and <−173 dBc/Hz for all offsets >600 Hz. The fractional frequency stability reaches $2\times10^{-15}$ at 0.1 s of averaging.

Continuous wave lasers locked to ultra-stable cavities deliver extraordinarily pure electromagnetic waves, reaching a frequency stability of $10^{-16}$ at 1 s. These signals have therefore served as a tool in experimental physics from precision spectroscopy and optical atomic frequency standards, to gravitational wave detection and tests of fundamental physics. The utility of ultra-stable lasers can be extended to the rf and microwave domain via optical frequency division (OFD), where a femtosecond optical frequency comb is phase-locked to the stable optical frequency reference. This coherent division of an optical signal to the microwave domain results in phase noise power ~90 dB lower than that of the optical reference, yielding some of the lowest phase noise microwave signals produced by any means. Such low-noise microwaves have the potential to contribute in several applied and fundamental areas such as radar, transduction of quantum states between microwave and optical fields, and improving the performance of microwave atomic frequency standards such as cesium fountain clocks.

The frequency stability and phase noise of a cavity-stabilized laser is ultimately limited by the length stability of the reference cavity. Thermally driven fluctuations, primarily in the mirrors and coatings, set a fundamental limit to the cavity length stability, the impact of which is reduced in state-of-the-art systems by extending the cavity length or by operating at cryogenic temperatures. However, for many applications, including those in the microwave domain, it is desirable to have a stable laser that is compact, rigidly held, vibrationally insensitive, and mobile, thereby allowing operation outside the staid laboratory environment. Additionally, in contrast to optical clock applications, many microwave applications require low-noise performance in the millisecond-to-microsecond regime. Given the broad phase-locking bandwidth of some frequency combs used for OFD, the phase noise of the optical reference at millisecond time scales can directly impact the microwave phase noise. Demonstration of low-noise performance of the cavity-stabilized laser out to ~1 MHz offset frequency is therefore warranted.

This Example describes a rigidly-held optical reference cavity with easily manufacturable cylindrical design that can be 25 mm in length. For offset frequencies from 1 Hz to 1 kHz, near thermal-noise-limited performance is described, translating to a 10 GHz microwave with 1 Hz phase noise at −97 dBc/Hz and 1 kHz phase noise below −185 dBc/Hz. Characterization of the phase noise out to 1 MHz offset indicates the support of phase noise on a 10 GHz carrier below −173 dBc/Hz for offset frequencies beyond 600 Hz. These results address overcome challenges of having a simple, transportable cavity for microwave applications while simultaneously providing low phase noise.

For rigidly held cavities, a geometry is minimally sensitive to both the holding force and the vibrations coupled through the holding structure. The optical reference cavity, shown in FIG. 12, FIG. 13, and FIG. 14, has a cylindrical spacer with a large diameter-to-length ratio. This cavity geometry has a holding location where the cavity can be squeezed without affecting its length to first order. This effect can be understood by comparing the expected behavior from squeezing a cylinder with finite elasticity (Poisson's ratio>0 ratio>0) on its axis and along the rim at the first and second end faces. It would be expected that the cylinder's axis will compress in the former case and bulge in the latter. The squeeze-insensitive point is the diameter at which these two effects cancel. Finite-element analysis verified location of this point, the results of which are shown in FIG. 14. For a 25-mm-long cell (spacer), the zero crossing of the holding force sensitivity is provided at cell diameters larger than ~40 mm. The cell had a diameter of 50 mm as a compromise between the location of the squeeze-insensitive point being reasonably removed from the exterior edge of the cell and keeping the cell's volume constrained.

Figure 12:
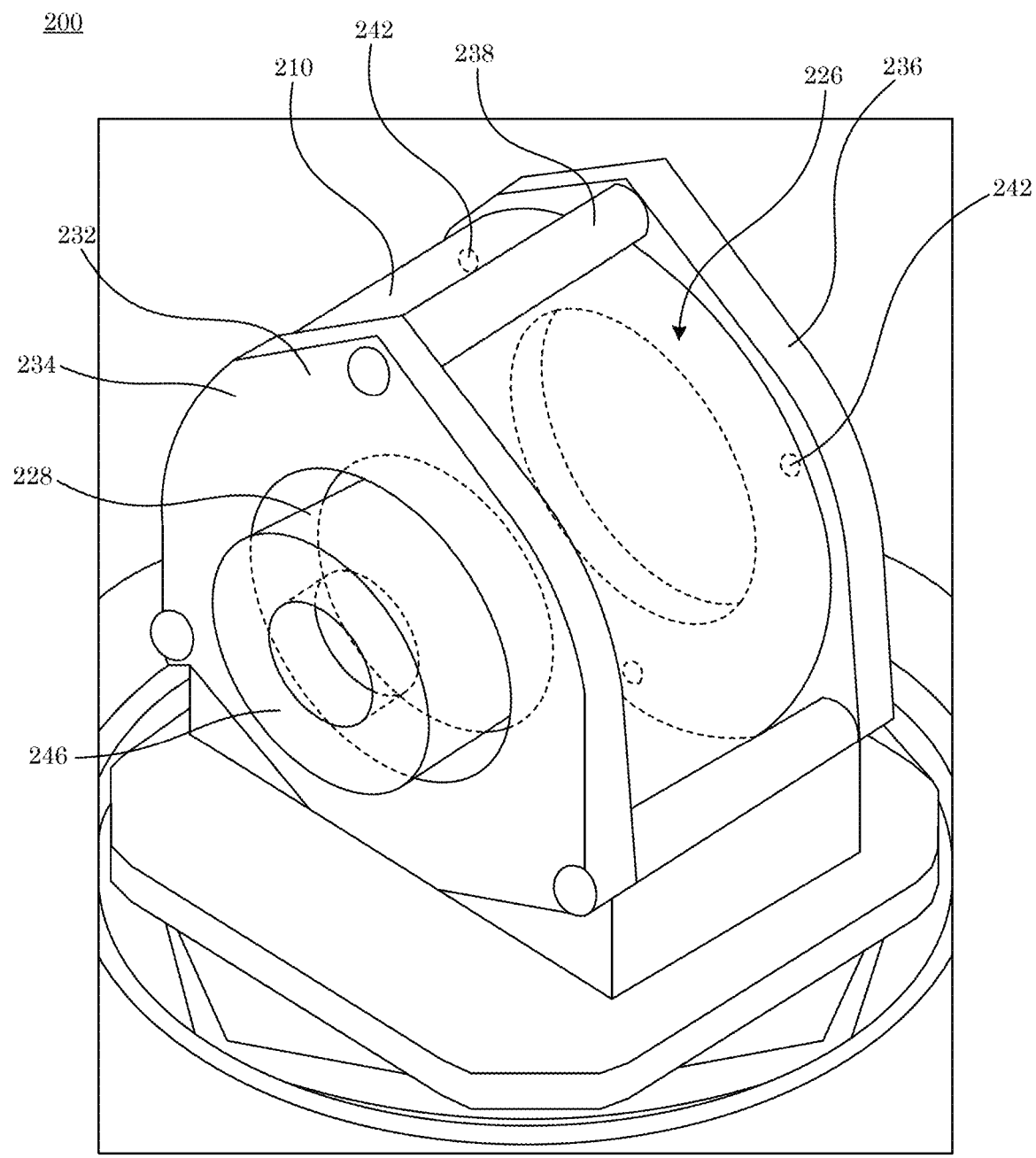
FIG. 12 shows a perspective view of an optical reference cavity 200.
Figure 13:
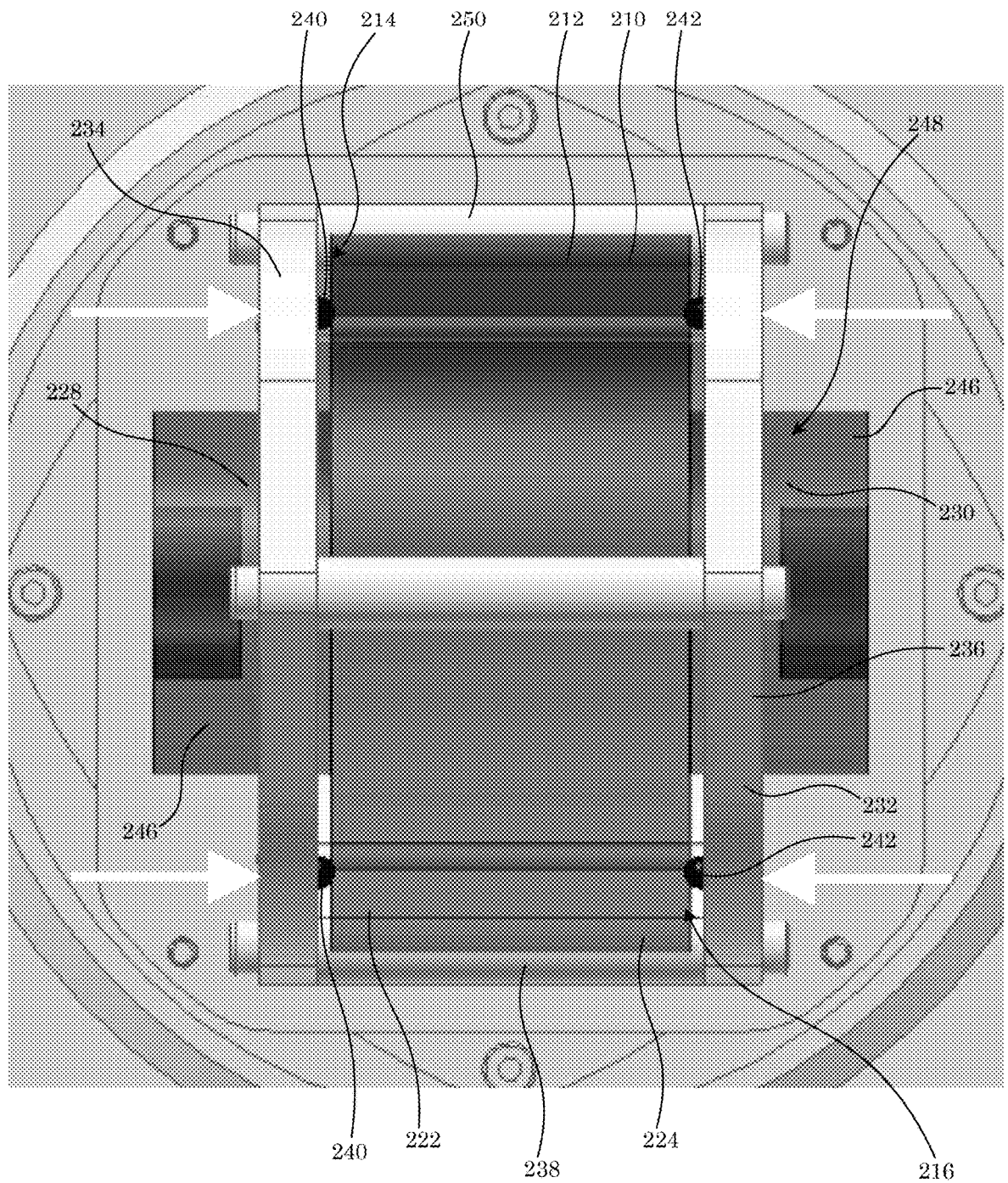
FIG. 13 shows a plan view of the optical reference cavity 200 shown in FIG. 12.
Figure 14:
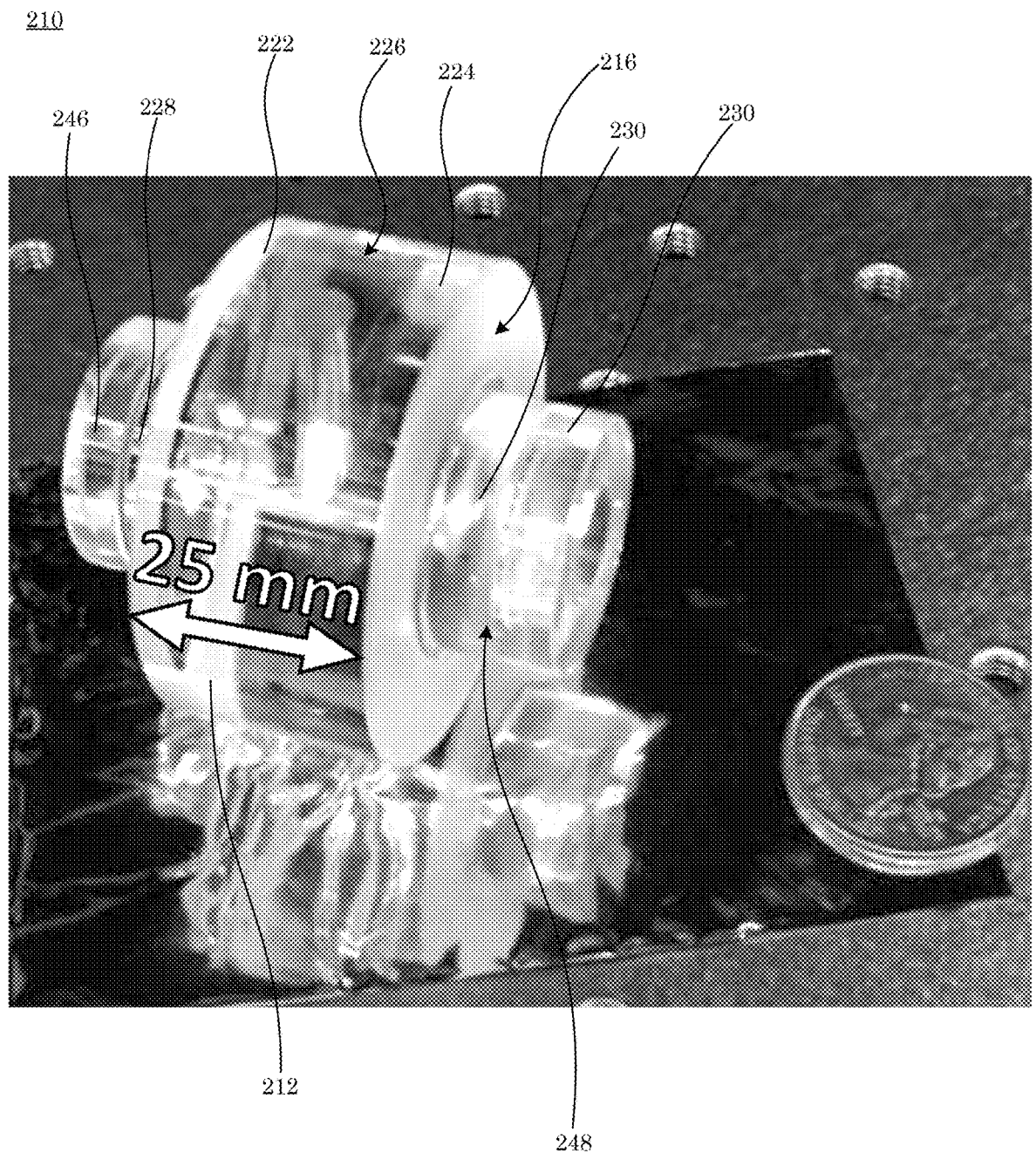
FIG. 14 shows a perspective view of a cell 210 for the optical reference cavity 200 shown in FIG. 12.
Figure 16:
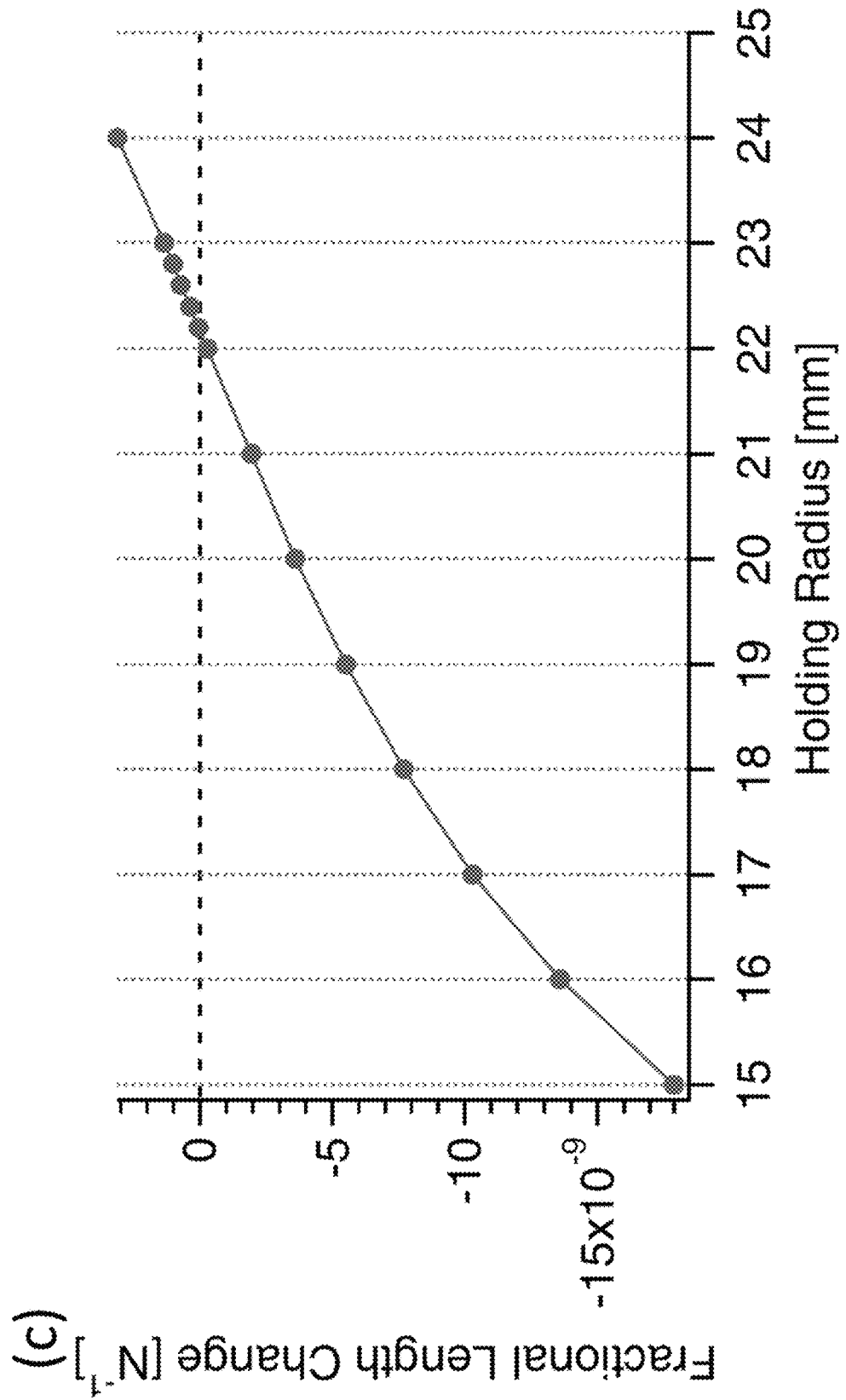
FIG. 16 shows a graph of fractional length change versus holding radius for an optical reference cavity 200.

FIG. 12 and FIG. 13 show the optical reference cavity with an Invar cavity holder, also referred to as a compression clamp. The arrows indicate location of the compression intermediaries that were elastomer balls used as point contacts to rigidly hold the cell. A radiation shield (not shown) covered the optical reference cavity. FIG. 14 shows the cell in an absence of the compression clamp, and FIG. 16 shows a calculated cavity fractional length change as a function of the holding radius with a zero crossing near 22 mm.

The cell (cavity spacer) was made out of ultra-low expansion (ULE) glass with a 5-mm diameter axial bore as the optical canal for an optical mode and an additional radial bore at a midpoint along a length of the cell for venting the optical canal. Low-loss, high-reflectivity dielectric mirrors on fused-silica substrates were optically contacted to end faces of the cell, and thermal expansion control rings made of ULE were disposed in contact on the outside of each of the mirrors. The ULE thermal expansion control rings were added to shift the zero crossing of the cell's coefficient of thermal expansion (CTE) to a selected temperature. With the recited substrate and thermal expansion control ring thicknesses, the optical reference cavity was about 50 mm long and had a 61 mL volume. The cell was rigidly held in a vacuum chamber by the compression clamp that included Invar compression platens that compressed compression intermediaries that included three 3.2 mm diameter elastomer balls disposed on each end face of the cell. Tests of different holding positions were performed, and the Invar compression platens were manufactured such that a location of the holding point at which the compressive force was applied to cell was varied in 100 μm increments around the predicted force-insensitive point of the cell.

Acceleration sensitivity of the cavity was measured at several holding positions. Here, the optical reference cavity was mounted on a rotatable optical breadboard, and all three spatial axes were flipped while monitoring the laser's frequency. The laser remained locked to the resonance throughout the measurements. A largest acceleration sensitivity was along the cavity axis at ~4.5×10$^{-1}$ g$^{-1}$ and was minimum at a holding radius of 24.5 mm. The acceleration sensitivity was larger than ideal because of a residual asymmetry in the holding structure or because of cavity manufacture. For subsequent characterization, the optical reference cavity was mounted on an active vibration isolation platform, and the measured residual acceleration spectrum did not significantly contribute to the resulting phase noise of the locked laser.

Figure 18:
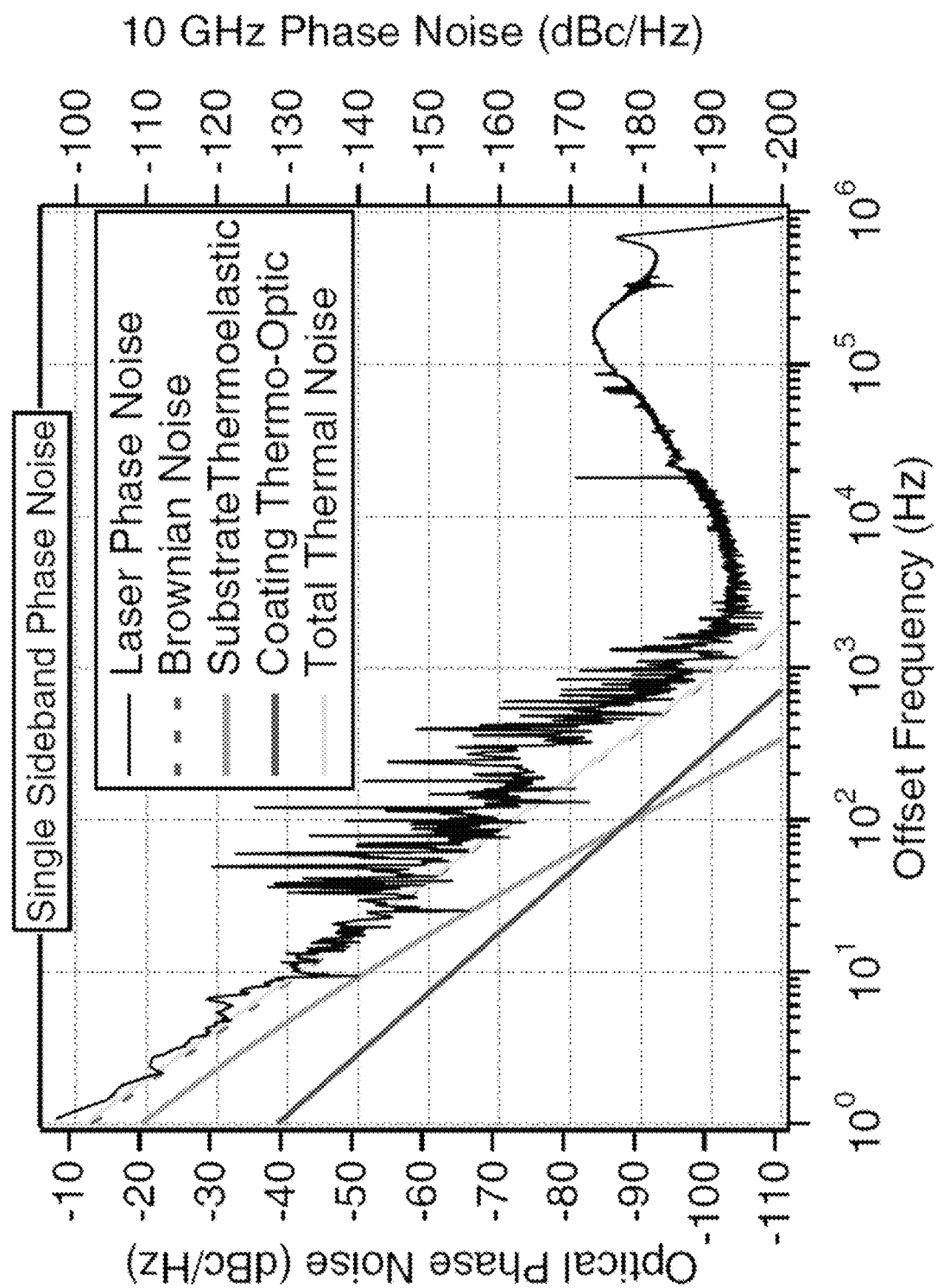
FIG. 18 shows a graph of optical phase noise versus offset frequency.

The elimination of vibration-induced cavity length fluctuations provided phase noise performance at the fundamental limit, given by Brownian noise in the mirror coatings and substrates, as well as thermo-elastic, thermo-optic, and thermo-refractive noise. Reduction of fundamental noise while maintaining a compact, room temperature design included generation of a large optical mode by using a mirror radius of curvature (ROC) that produced the optical reference cavity having a resonant optical mode produces a large beam spot on each end mirror. Increasing a spot size can of laser light at the mirrors of the optical reference cavity can be achieved by increasing the ROC of the mirrors or by including a near-concentric cavity. The optical reference cavity included a plano-10.2 m ROC design that provided an optical mode with intensity full width at half-maximum of ~490 μm with a thermal noise limit for the 25-mm-long cavity that was ~−9 dBrad2/Hz at 1 Hz offset. Thermal noise contributions and total thermal noise are shown in FIG. 18.

Figure 17:
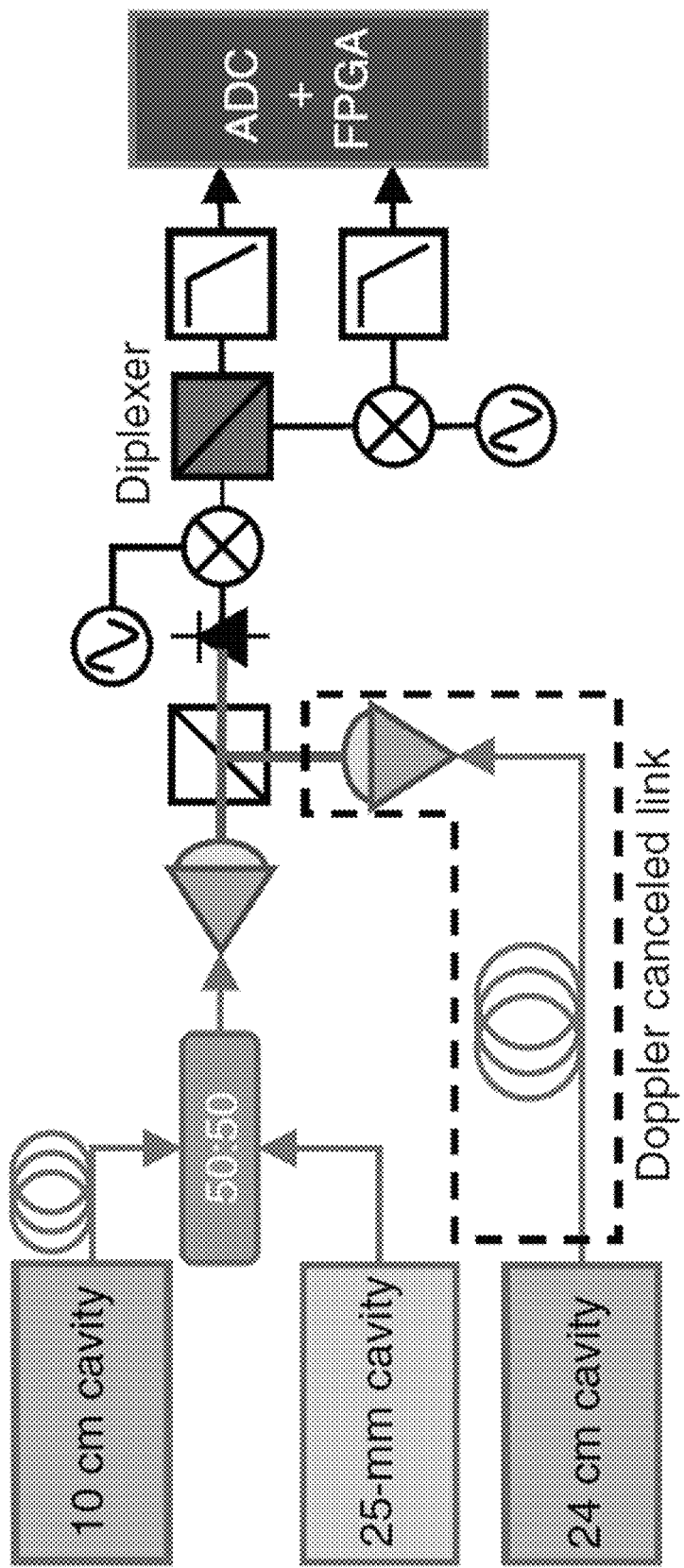
FIG. 17 shows a phase noise measurement system that includes an optical reference cavity 200.
Figure 19:
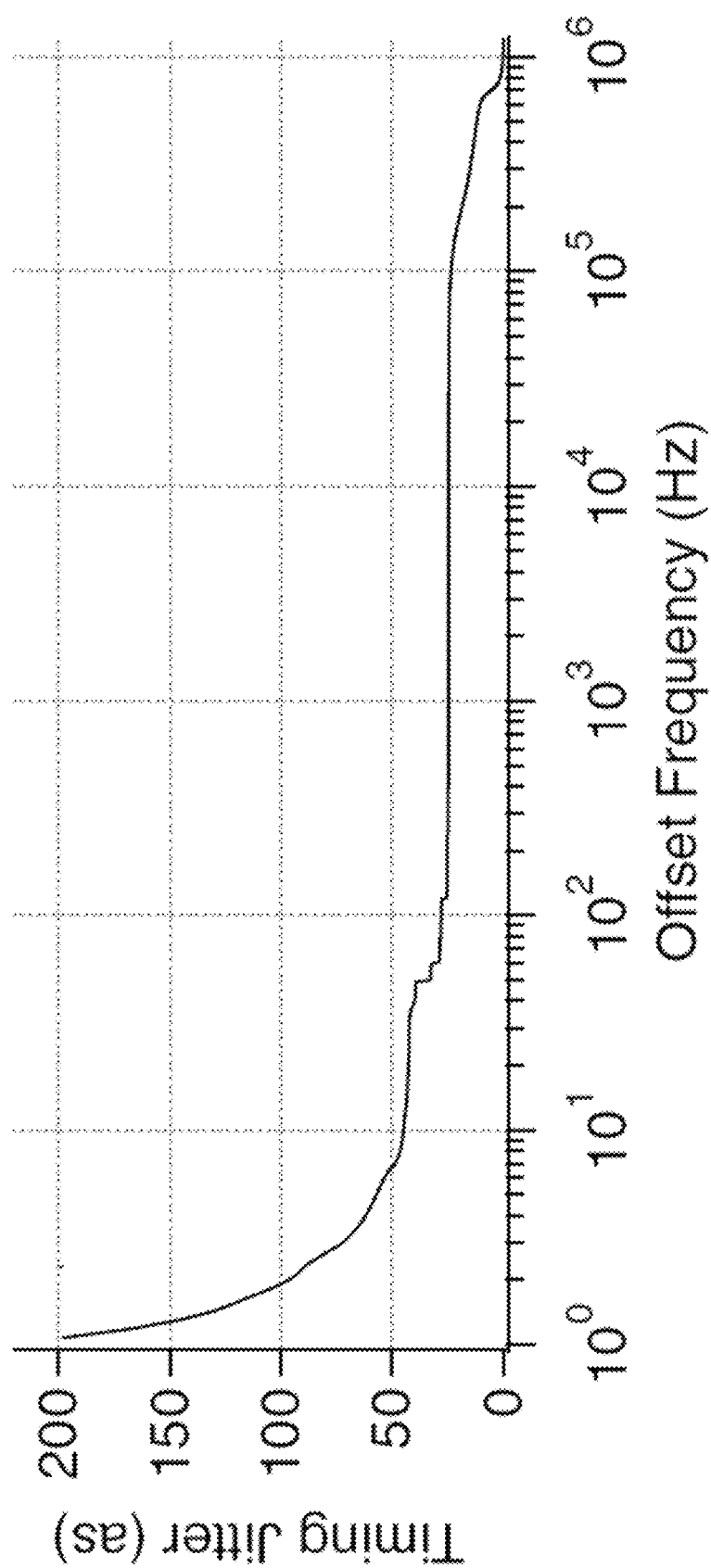
FIG. 19 shows a graph of timing jitter versus offset frequency.

FIG. 17 shows a system for measuring phase noise in which stabilization light from the 25 mm optical reference cavity and from a 10 cm cavity was first combined in a fused fiber coupler and subsequently launched into free space. This beam was then combined with light from a 24 cm cavity and focused on a fast photodiode, providing three beat-notes between all pairs of laser lights. The two beat-notes with the 25 mm cavity laser were downconverted to suitable frequencies for simultaneous digital sampling and offline processing. FIG. 18 shows a phase noise of the laser stabilized to the 25 mm optical reference cavity. The phase noise of the laser was recovered by averaging the cross-spectrum of both beat-notes. The total thermal noise line was the total predicted thermal noise. FIG. 19 shows an integrated timing jitter as a function of offset frequency. The total timing jitter in the 1 Hz to 1 MHz band was ~200 as.

A single-longitudinal-mode fiber laser at 1070 nm was used in measurements of cavity photon lifetime, and finesse was ~400,000. For stabilization, the laser was phase modulated using a temperature-stabilized fiber-pigtailed electro-optic modulator (EOM) and sent to the reference cavity. The reflected sidebands were demodulated to obtain a Pound-Drever-Hall (PDH) error signal. The laser frequency was locked with 700 kHz bandwidth by feedback to the driving frequency of an acousto-optic modulator (AOM) and to the laser cavity length for fast and slow corrections, respectively. The laser power impinging on the cavity was ~70 μW and was stabilized by photo detecting a fraction of the incoming light and correcting the power driving the AOM.

The setup was placed in an enclosure, but, aside from the EOM, it was not actively temperature stabilized. Also, despite the higher residual amplitude modulation (RAM) common to fiber-pigtailed EOMs, no control of the RAM beyond EOM temperature stabilization was applied. Such measures did not improve phase noise for offset frequencies >1 Hz. At longer time scales, both effects played a role that limited ultimate long-term stability. However, for many applications of low-noise microwaves, the stability at longer time scales was inconsequential, and the reduced system complexity was advantageous. The useable output power, taken before the EOM, was ~3 mW.

To characterize the phase noise of cavity-stabilized laser, two heterodyne beat-notes were obtained with two independent reference lasers, both near 1070 nm, locked to respective cavities, as shown in FIG. 17. One of the references was locked to a 10-cm-long cavity and had a 1-s Allan deviation of 8×10$^{-16}$. The other reference was locked to a 24-cm-long cavity and had a 1-s Allan deviation of 4×10$^{-16}$. The frequencies of all three lasers were within 2 GHz of each other and provided direct heterodyne beats between all lasers and characterization of performance. With a combination of measurements on the individual beat-notes, several regions in the phase noise spectrum were limited by one or both of the reference lasers. To recover the phase noise of the 25 mm cavity laser, both beat-notes were simultaneously sampled, and a cross-spectrum was subsequently calculated by averaging a complex product of the fast Fourier transform of each of the phase records. Since noise of the reference lasers was uncorrelated, the averaging rejected their phase noise by N-√N, where N is the number of averages.

The phase noise measurement is shown in FIG. 18. The laser remained nearly thermal noise limited for 3 decades (1 Hz to 1 kHz). Between 100 Hz and 1 kHz, a small amount of residual noise occurred, partially due to 60 Hz harmonics from the system power sources. To achieve thermal-noise-limited performance, at least 50 μW of power was used and improved the PDH sensitivity and lowered electronic noise below the thermal noise limit. Between 700 Hz and 2 kHz, electronic noise originating within the PDH loop contributed to the phase noise, resulting in a slight increase above the thermal noise limit. Beyond 2 kHz, the phase noise of the laser increased due to limited loop gain to suppress the free-running laser noise. From the phase noise in FIG. 18, the 25 mm cavity laser supported 10 GHz generation <−190 dBc/Hz in the 2 kHz-10 kHz offset range and supported <−173 dBc/Hz for all offset frequencies higher than 600 Hz. This phase noise level was comparable to or below the lowest OFD microwave phase noise results yet achieved for offset frequencies greater than 100 Hz.

The phase noise was integrated to obtain a rms radian figure of merit. Integration from 1 Hz to 1 MHz yielded ~0.35 radrms for the optical carrier, corresponding to 200 attoseconds of timing jitter. Further integration out to the optical Nyquist frequency of a shot-noise-limited floor assuming 1 mW of laser power (−160 dBrad2/Hz) increased integrated jitter to 210 attoseconds, integrated from 1 Hz to 140 THz. An estimate of the theoretical minimum for a thermal-noise-limited cavity with 1 mW output power is a phase noise that is −9 dBrad2/Hz at 1 Hz and decreases as 1/f3 until obtaining a shot noise floor of −160 dBrad2/Hz, yielding ~160 attoseconds. Despite the demonstrated laser phase noise deviating from the shot noise and cavity thermal noise, ~80% of its jitter was attributed to these fundamental limits because a large fraction of the jitter was due to the thermal noise from 1 Hz to 10 Hz, as included in FIG. 19.

Figure 20:
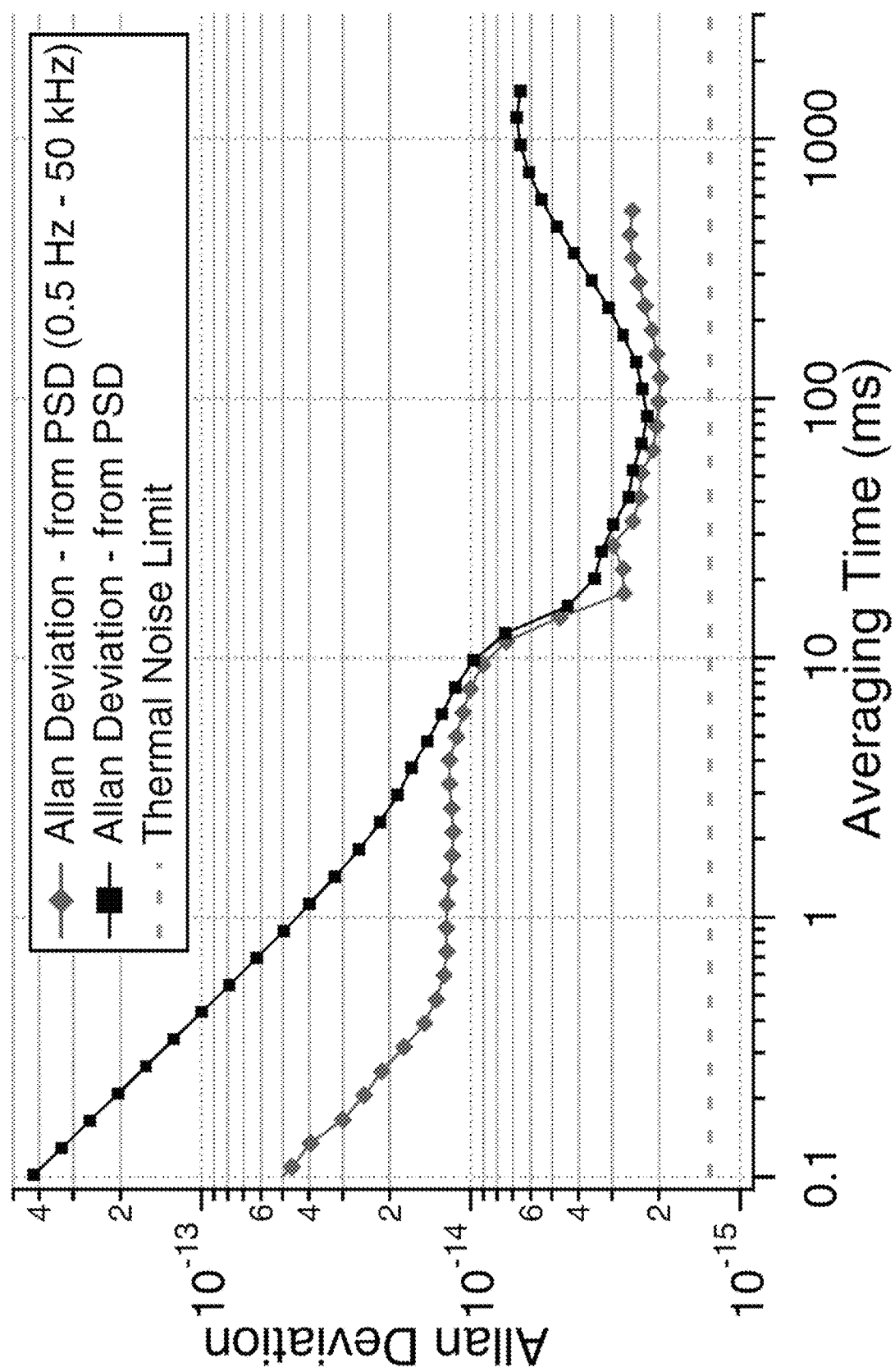
FIG. 20 shows a graph of Allan deviation versus averaging time.

The phase noise spectrum had information to calculate Allan deviation via integration with a kernel for each averaging period. The optical reference cavity had ~2×10$^{-15}$ Allan deviation at 0.1 s of averaging. For long-term averaging, the Allan deviation was dominated by the drift due to uncompensated cavity temperature changes. For determining different contributions to the Allan deviation, integration was performed using the entire phase noise spectrum, shown the upper curve in FIG. 20, and one using only the frequency band between 0.5 Hz and 50 kHz, shown in the lower curve. Instability due to the additional noise in the 100 Hz-1 kHz band was evident once the high-offset phase noise was removed. Also, removing frequencies below 0.5 Hz partially compensated for long-term drift. These results were plotted in FIG. 20 with calculated thermal noise limit at 1.6×10$^{-15}$ in which stability reached 2×10$^{-15}$ that was about 1.3 times the thermal noise limit.

The optical reference cavity was a compact, thermal-noise-limited, cavity-stabilized continuous wave laser that supported ultra-low-noise microwave generation. The stabilized laser system that included the optical reference cavity was near thermal noise limited from 1 Hz to 1 kHz and supported 10 GHz microwave generation with phase noise below −173 dBc/Hz for all offset frequencies >600 Hz. Improvement of close-to-carrier noise can be accomplished with use of crystalline mirror coatings. It is contemplated that a laser with lower free-running noise, such as a Brillouin laser or self-injection locked semiconductor laser, improves noise far from carrier. With these improvements, a 25-mm-long cavity supporting 10 GHz phase noise approaching −106 dBc/Hz at 1 Hz and remaining below −180 dBc/Hz far from the carrier is provided. Minimization of the vibration sensitivity with long-term temperature stabilization and RAM stabilization improves long-term stability so that the optical reference cavity is used in transportable optical atomic clock systems.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An optical reference cavity for producing thermal-noise-limited optical radiation, the optical reference cavity comprising:
   a cell comprising:
      a cylindrical body;
      a first end face disposed at a first end of the cylindrical body;
      a second end face disposed at a second end of the cylindrical body and opposing the first end face;
      an optical canal extending through the cell from the first end face to the second end bounded by an optical cavity wall that comprises an interior cylindrical geometry; and
      an exterior surface extending from the first end face to the second end and comprising an exterior cylindrical geometry that circumscribes and is coaxial with the interior cylindrical geometry of the optical cavity wall;
   a first mirror disposed on the first end face;
   a second mirror disposed on the second end face, and the first mirror and the second mirror hound the optical canal;
   an aspect ratio given by a length of the optical canal to a diameter of the cylindrical body at the exterior surface that less than 1 and greater than 0.1;
   a compression clamp for receiving and rigidly holding the cell through compression, the compression clamp comprising:
      a first compression platen disposed on the first end face;
      a second compression platen disposed on the second end face; and
      a compression fastener that engages the first compression platen and the second compression platen so that:
         the first compression platen and the second compression platen compress the cell by exerting a compressive force to the first end face and the second end face, wherein the compressive force is exerted at a radius from a central axis of the cell so that the cell is compressed by the compression clamp, and
a length of the optical canal is unperturbed to first order with a magnitude of the compressive force;
a first compression intermediary interposed between the first compression platen and the first end face; and
a second compression intermediary interposed between the second compression platen and the second end face, and
the length of the optical canal is insensitive to vibration coupled to the cell by the compression clamp, the first compression intermediary, and the second compression intermediary.

2. The optical reference cavity of claim 1, further comprising a radial bore disposed in the cylindrical body of the cell for venting the optical canal, the radial bore being in fluid communication with the optical canal and the exterior surface of the cell,
wherein the radial bore extends from the optical canal to the exterior surface.

3. The optical reference cavity of claim 1, further comprising a thermal expansion control ring disposed on an outer surface of the first mirror or the second mirror, the thermal expansion control ring controlling a thermal expansion of the cell through straining the mirror upon which the thermal expansion control ring is disposed.

4. The optical reference cavity of claim 1, wherein the cell further comprise ultralow expansion glass.

5. The optical reference cavity of claim 1, wherein a diameter of the optical canal is from 1 mm to 50 mm.

6. The optical reference cavity of claim 1, wherein a diameter of the cell is from 5 mm to 100 mm.

7. The optical reference cavity of claim 1, wherein the length of the cell is from 5 mm to 50 mm.

8. The optical reference cavity of claim 1, wherein the radius at which the compressive force is exerted of the cell is from 1 mm to 30 mm.

9. The optical reference cavity of claim 1, wherein the first mirror and the second mirror independently comprise a radius of curvature is from 5 mm to flat.

10. The optical reference cavity of claim 1, wherein the first mirror and the second mirror independently comprise a radius of curvature that provides optical reference cavity with an optical cavity that has a fractional frequency instability from $1\times10^{-12}$ to $1\times10^{-16}$.

11. The optical reference cavity of claim 1, wherein the compressive force is exerted at the radial position so that a fractional length change of the optical canal is from $-1\times10^{-8}$ $N^{-1}$ to $0$ $N^{-1}$ to prevent substantially all bulging or compressing of the cell.

12. The optical reference cavity of claim 1, wherein the compression fastener comprises a spacer that has a fixed length or an adjustable length.

13. The optical reference cavity of claim 1, wherein the compression clamp further consists essentially of a low coefficient of thermal expansion material that provides an invariable expansion and contraction in response to a temperature change of the compression clamp.

14. The optical reference cavity of claim 13, wherein the low coefficient of thermal expansion material has a coefficient of thermal expansion from $5\times10^{-7}$ $K^{-1}$ (0.5 ppm/° C.) to $5\times10^{-6}$ $K^{-1}$.

15. The optical reference cavity of claim 1, wherein the first compression intermediary and the second compression intermediary independently comprise a plurality of spherical spacers, a gasket, or a combination of spherical spacer and gasket.

16. The optical reference cavity of claim 15, wherein the gasket and spherical spacers independently comprise an elastomer.

17. The optical reference cavity of claim 15, wherein an acceleration sensitivity of the optical reference cavity is from IQ'8 g 1 to IQ12 g1', and
a thermal noise limit of the optical reference cavity is from $-60$ dBrad$^2$/Hz to $-125$ dBrad$^2$/Hz, at 1 Hz offset.

18. A stabilized laser system for producing ultra-low-noise optical radiation, the stabilized laser system comprising:
a laser that:
produces laser light;
receives stabilization light or a stabilization signal; and
locks to stabilization light or the stabilization signal so that the laser light is ultra-low-noise optical radiation;
the optical reference cavity of claim 1 in optical communication with laser and that:
receives laser light from the laser; and
produces the stabilization light;
communicates the stabilization light or the stabilization signal to the laser.

19. The stabilized laser system of claim 18, wherein the stabilized laser system has a laser phase noise that is nearly thermal noise limited from 1 Hz offset to 1 kHz offset and provides 10 GHz generation with phase noise at $-100$ dBc/Hz at 1 Hz offset and $<-1.73$ dBc/Hz for offsets greater than Hz.

20. The stabilized laser system of claim 18, wherein the stabilized laser system has a fractional frequency stability of $2\times10^{-15}$ at 0.1 s of averaging.

* * * * *